United States Patent [19]

Eisler et al.

[11] Patent Number: 5,844,569
[45] Date of Patent: Dec. 1, 1998

[54] DISPLAY DEVICE INTERFACE INCLUDING SUPPORT FOR GENERALIZED FLIPPING OF SURFACES

[75] Inventors: Craig G. Eisler; G. Eric Engstrom, both of Kirkland, Wash.

[73] Assignee: Microsoft Corporation, Redmond, Wash.

[21] Appl. No.: 641,014

[22] Filed: Apr. 25, 1996

[51] Int. Cl.$^6$ .................................................. G06F 15/00
[52] U.S. Cl. ........................ 345/433; 345/507; 345/568; 345/514
[58] Field of Search .......................... 345/418–20, 422, 345/425, 429–31, 473, 112–16, 507–8, 509, 511–12, 514, 518, 433, 118, 516–17, 521, 526

[56] References Cited

U.S. PATENT DOCUMENTS

| | | | |
|---|---|---|---|
| 5,394,523 | 2/1995 | Harris | 345/501 |
| 5,428,722 | 6/1995 | Marsh et al. | 345/433 |
| 5,455,599 | 10/1995 | Cabral et al. | 345/133 |
| 5,519,825 | 5/1996 | Naughton et al. | 345/419 |

OTHER PUBLICATIONS

Edson, Dave, "The Game SDK for Windows 95 gives you direct hardware control for speedy animation" *Microsoft Systems Journal*, v10, n11, p. 15(15), Nov., 1995 reprinted pp. 1–36.

*Implementing Games for Windows Using the WinG API and the WaveMix DLL*, James Finnegan, Microsoft Systems Journal, pp. 61–81, Jan., 1995.

*Primary Examiner*—Rudolph J. Buchel, Jr.
*Attorney, Agent, or Firm*—Klarquist Sparkman Campbell Leigh & Whinston LLP

[57] ABSTRACT

A method for generalized flipping of pixmaps and other arrays of image data in a software display device interface for computer generated graphics applications. The display device interface enables application programs to create flipping surface structures representing on and offscreen pixmaps, textures, sprites, overlays, etc. The display device interface includes a flip function to control the flipping of these flipping structures. It also includes functions to synchronize access to the surfaces represented by the flipping structure. Applications and other processes can use these access synchronization functions to manipulate surfaces represented by the flipping structure without conflicting with a client's use of the surface. Clients other than the display controller can act as clients of the flipping operation. For instance, flipping structures can be used to implement video texture mapping, where the client of a texture flipping structure is a 3D rendering system.

23 Claims, 9 Drawing Sheets

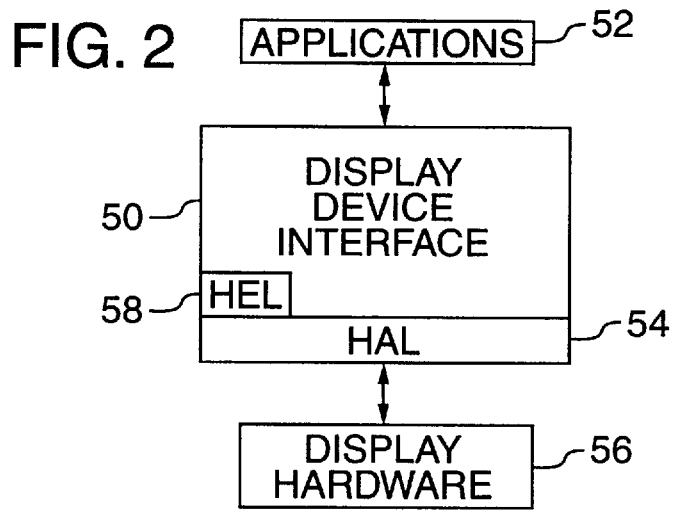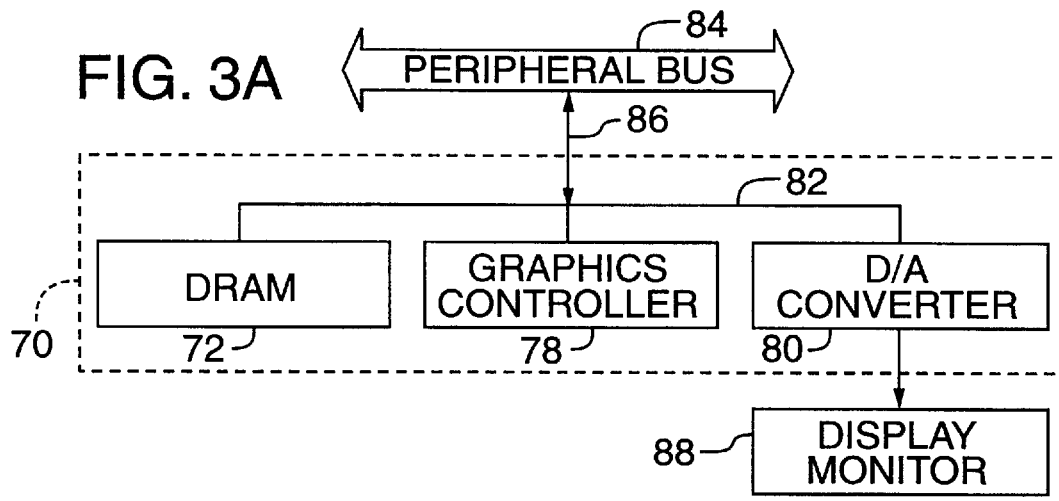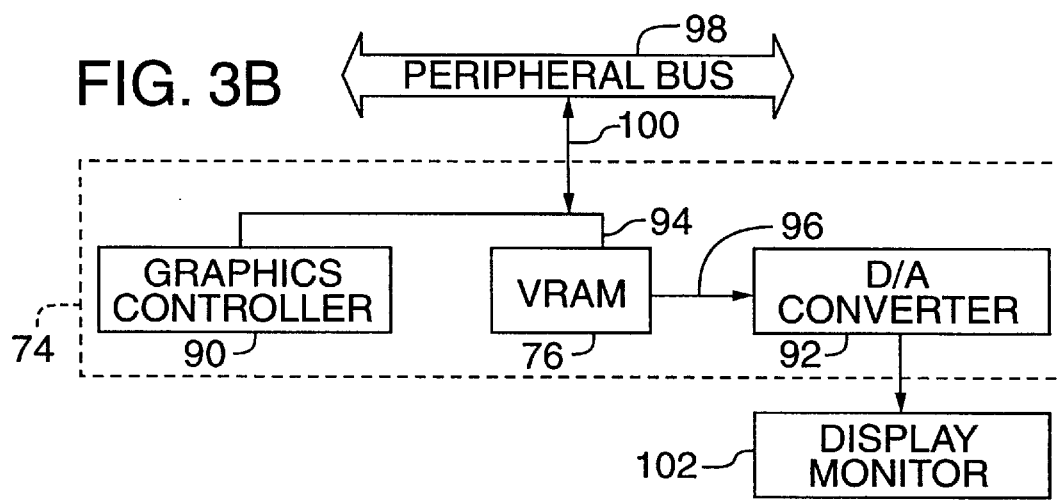

DISPLAY DEVICE INTERFACE INCLUDING SUPPORT FOR GENERALIZED FLIPPING OF SURFACES

This application is related to the following co-pending U.S. patent applications, which are commonly assigned:

Resource Management For Multimedia Devices In A Computer by Craig G. Eisler and G. Eric Engstrom, filed on Apr. 25, 1996 as application Ser. No. 08/637,483;

Method And System For Flipping Images In A Window Using Overlays by G. Eric Engstrom and Craig G. Eisler, filed on Apr. 25, 1996 as application Ser. No. 08/639,333;

Method And System In Display Device Interface For Managing Surface Memory by G. Eric Engstrom and Craig G. Eisler, filed on Apr. 25, 1996 as application Ser. No. 08/641,015;

Multimedia Device Interface For Retrieving And Exploiting Software And Hardware Capabilities by G. Eric Engstrom and Craig G. Eisler, filed on Apr. 25, 1996 as application Ser. No. 08/641,017;

Method And System For Managing Color Specification Using Attachable Palettes And Palettes That Refer To Other Palettes by Craig G. Eisler and G. Eric Engstrom, filed on Apr. 25, 1996 as application Ser. No. 08/641,017; and System For Enhancing Device Drivers by Craig G. Eisler and G. Eric Engstrom, filed on Apr. 25, 1996 as application Ser. No. 08/637,530.

These applications are hereby incorporated by reference.

TECHNICAL FIELD

The invention relates to software interfaces for display devices and more specifically relates to services in a display device interface that support flipping of different types of image data including on and offscreen images, overlays, sprites, texture maps, etc.

BACKGROUND

When creating an application program for a computer such as a PC, the design of the user interface is a major concern to the application developer. In developing the user interface, the programmer typically has to include code to capture input from the user and provide output using the computer's peripherals. The interaction between an application and peripheral devices can vary significantly depending on the type of application and sophistication of the user interface. In a spreadsheet program, for example, the application needs to be informed when the user has updated a cell in a spreadsheet so that it can update the spreadsheet and display the proper result. Since the display changes rather infrequently and does not contain complex graphics in this example, the performance of the underlying software and hardware that controls the user interface is less critical. As such, the programmer can rely on a high level interface to graphics and input devices without being particularly concerned with the performance of the interface. The user interfaces of many of today's multimedia applications, however, are significantly more complex and have rigorous performance requirements. In multimedia games for example, the interaction between the application and peripherals is critical to achieving a highly interactive and realistic user interface. The interaction between the application can include not only reading input from a joystick and displaying images, but can also include mixing audio files to generate sound effects, rendering three dimensional animation using a graphics accelerator, decompressing and playing video, and updating the display image fast enough to depict realistic scenes.

To control a peripheral devices in this manner, the application program can attempt to control the peripheral devices directly or can perform operations through a software interface. A software interface provides access to certain services through a specified set of operations which can be invoked to request the services. For instance, an interface to sound effect services might include operations to "prepare a sound for playing," "start playing a sound," and "wait until a sound has finished playing." In response to a request for a particular service, the interface attempts to provide the service by taking steps to control the underlying hardware. In effect, the interface does what the application would have to do if it were to try to control the hardware directly. In addition to communicating with the hardware, an interface sometimes provides some resource management so that programs running in the computer can share access to the limited hardware resources.

For the vast majority of applications, application programmers rely on some form of software interface to interact with the computer's peripherals. Programmers typically rely on software interfaces to the peripherals so that they can focus on the specifics of their application rather than on the specifics of controlling a particular device. Unfortunately, many of today's software interfaces cannot provide the level of performance that multimedia applications demand.

There are a number of software products on the market today that provide interfaces between application programs and peripheral devices. These interfaces are sometimes characterized as low or high level interfaces, and device independent or dependent. A high level interface is one whose operations request big-picture strategic services, such as "start playing this sound" or "display this document." A low level interface is one whose operations request tactical services specifically, such as "tell the sound card at I/O (input/output) address 220 to point its DMA buffer to memory address 1000000" or "tell the video card to copy the 64×64 pixel region from a location starting at address 0000001 to a location starting at 1000000 in video memory. In general a high level interface may be easier for a programmer to use, but a low level interface may provide better performance and functionality. Ease of use comes from having fewer details to take care of, while better performance comes from taking advantage of special cases the hardware handles well. Hiding details tends to disguise special cases as well.

The terms "device independent" and "device dependent" refer to the extent to which the interface is specific to a particular piece of hardware. Device independent interfaces provide operations that are not specific to a particular brand of hardware device. Instead, the operations hide the detail of the hardware from the application and take care of these details internally. In contrast, device dependent interfaces provide operations to control specific features of a particular piece of hardware. To write an application using a device dependent interface, the application developer has to have a detailed understanding of how the specific hardware operates.

Hardware dependence is usually not favored because it is not flexible to changes in the underlying hardware and can often lead to resource contention problems. Programs written for a device dependent interface can be rendered obsolete by updates to the underlying hardware, and commonly do not work for more than one brand of peripheral. In addition, device dependent interfaces are more susceptible to resource contention problems because an application has access to its state information and can render it inoperable for other applications.

In general, high level interfaces tend to be device independent because they hide details, whereas low level interfaces tend to be device dependent because they reveal details. For instance, "play a sound" does not rely on the details of any sound card, but "tell the sound card at I/O address 220 . . . " obviously does.

While device independent, high level interfaces are generally easier to use for the reasons explained above, they typically are unable to provide the performance and functionality needed for certain types of applications. High level interfaces are often not sufficient for game applications and other multimedia applications because they are often incapable of achieving the desired performance. Games demand higher performance because they must achieve a high degree of user interactivity and visual realism. A game application typically has to collect rapidly changing user input, compute its impact on the current scene, and display the corresponding images and playback sounds with imperceptible delay.

Because they are designed for specific tasks, peripherals are usually much better at performing certain types of functions than the host processor. For example, a video card may have special purpose hardware that can copy pixels much faster than the CPU. A high level interface may not take advantage of this particular feature or may include additional layers of code that consume valuable CPU cycles and time before the operation is even started on the peripheral.

Since many peripherals have their own computing resources, such as processors and memory, performance can be improved by off-loading some tasks to the peripheral rather than consuming the resources of the host CPU. However, without a low level interface to expose these resources to the application, they are not fully exploited.

One particular operation that is especially important in multimedia applications is the process of drawing images for display. To achieve better performance, it is often necessary to manipulate a video card directly. Video cards typically provide a writable address register that stores a pointer to area in the video card's memory holding a screen-sized display image. In order for an application to control this register directly, the application must have specific information about the card and must keep track of the specific address location of the display image stored in the video card. In addition, the application has to keep track of timing information of the display monitor so that it can properly instruct the video card to display an image at a specified location.

These hardware related details make it difficult for applications to control double buffering. The term, double buffering, refers to a technique for generating a display image. In this well known technique, two different memory buffers are used to generate an image. While a first image is being rendered to a first buffer, the display hardware scans out a complete image from a second buffer. To update the display with a new image, the display hardware then performs a buffer swap. The display image that was just under construction is then transferred to the display screen, and a new image is constructed in the buffer that held the previous display image. Double buffering is necessary to prevent the display hardware from displaying the pixels in a region in video memory before the application has finished drawing all of the pixels in the display image.

Support for double buffering in today's display controllers and software interfaces is limited to screen flipping. In the traditional method of screen flipping, only an entire display image is flipped, and the display device is the client of the flipping operation. This process is limited because it does not support flipping of other types of images such as offscreen images, overlays, sprites, texture maps, etc. It is also limited because the display device is the only client of the flip. Other software or hardware components of the system cannot be the consumer of a flip operation.

To our knowledge, conventional screen flipping does not support flipping of overlays, sprites, or textures. An overlay is a display surface that is overlayed on top of (or sometimes behind) the primary display surface. A sprite is similar to an overlay, and traditionally refers to a display surface that is blended or composited with the primary surface.

A texture map refers to a display surface that is mapped onto a graphical object. Texture maps are commonly used in 3D graphics rendering to represent intricate detail on the surface of a 3D object. Instead of modelling the surface detail with a complex mesh of polygons, the 3D rendering system maps the texture on to the object.

Because of these limitations of conventional screen flipping, it is difficult to implement advanced graphics features. The technique of flipping a surface is useful and sometimes even critical to achieve smooth animation. If an interface or the underlying hardware does not support flipping of overlays or sprites, it is more difficult to achieve smooth animation of the overlays or sprites. Similarly, without support for flipping textures, it is difficult to implement advanced features such as video texture mapping without unsightly effects.

SUMMARY OF THE INVENTION

The invention provides a method and system for supporting generalized flipping of surfaces. Surfaces generally refer to arrays of image data including pixmaps, depth (z) buffers, alpha (transparency/opacity) buffers, and the memory that store this data is called surface memory. The generalized flipping method is implemented in a display device interface, which enables application programs and other processes executing in a computer to control a display device. The flipping method is general because it allows for flipping of any type of surface, in addition to the traditional notion of screen flipping, and it enables clients other than the display device to act as the consumer of a flip.

To support generalized flipping, the display device interface provides services to create flipping surface structures, to flip a flipping structure, and to synchronize access to surface memory that the surface structures represent. The display device interface is a software interface to display hardware in a host computer. To create a flippable surface, an application or other process in the computer invokes the service in the display device interface to create a flipping surface structure. This surface structure is capable of representing different types of surfaces including an offscreen pixmap, a pixmap that covers less than the entire display screen, a texture map, an overlay, an alpha buffer, and a Z buffer, for example.

The flipping service in the display device interface can flip a flipping surface structure representing any of these types of surfaces. In response to a request to flip, a flip function exchanges the surface memory currently serving as the front and back buffer. The flip function determines whether and when a flip can be performed. During a flip operation, the display device interface controls access to the surface memory represented by the flipping structure.

Producers and clients of the flipping structure can request access to the front and back buffers of a flipping structure by invoking a service in the display device interface to synchronize access to a surface. A producer is an application program or other process in the computer that is drawing a surface to a back buffer in a flipping structure. A client is a process in the computer or a hardware device that uses the surface in the front buffer to generate a display image or perform additional graphics processing. For example, the client can be the display controller in the computer or can be an application or process running in the computer. An example of a client that uses the front surface to perform additional graphics processing is a 3D rendering system.

In one implementation the display device interface provides lock and unlock functions that a producer or client of a surface can use to access underlying surface memory. When a producer or client gets a lock on a surface or part of a surface, other producers or clients cannot access that surface or part of the surface. The unlock function is used to tell the display device interface that the client or producer using the surface is finished.

Generalized flipping as introduced above enables applications to perform a variety of graphics rendering operations that are difficult or impossible to perform using conventional display device interfaces. For example, video texture mapping can be performed using a texture flipping structure. A frame of video can be written to the back buffer of the texture flipping structure while a 3D graphics rendering system reads and maps a frame of video to the surface of a graphical object. As another example, sprite or overlay flipping structures can be used to animate a portion of a display image. A variety of other features are possible as well.

Further features and advantages of the invention will become apparent with reference to the following detailed description and accompanying drawings.

BRIEF DESCRIPTION OF THE DRAWINGS

FIG. 2 is a block diagram illustrating the architecture of a device interface in which one embodiment of the invention is implemented.

FIGS. 3A, 3B, 3C, and 3D are block diagrams showing four examples of display device architectures.

DETAILED DESCRIPTION

Figure 1:
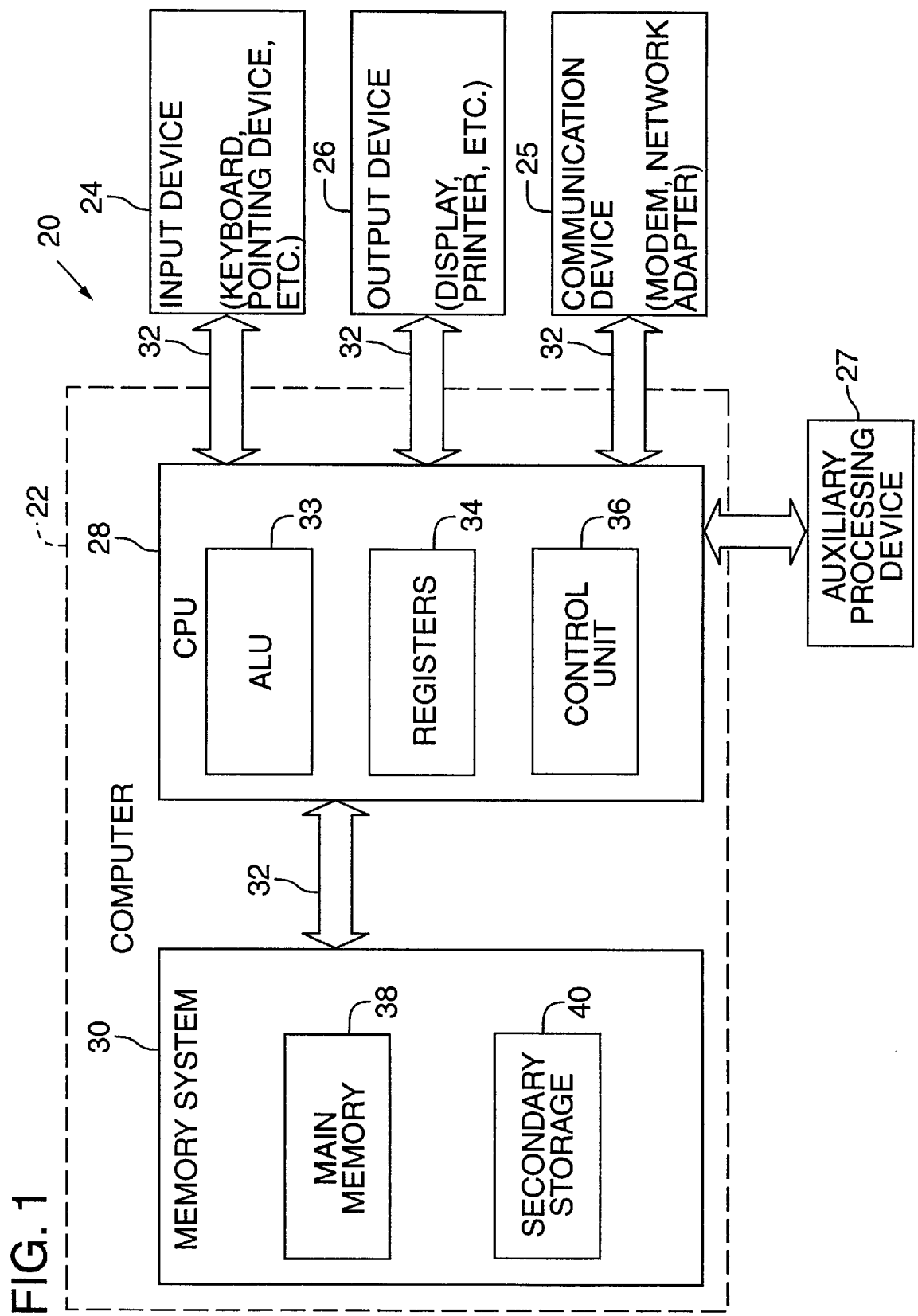
FIG. 1 is a general block diagram of a computer system 20 in which an embodiment of the invention can be implemented.

FIG. 1 is a general block diagram of a computer system 20 in which an embodiment of the invention can be implemented. The computer system 20 includes as its basic elements a computer 22, one or more input devices 24 and one or more output device 26. The computer system can also include a communication device 25 and an auxiliary processing device 27.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices, and secondary storage 40 in the form of a medium such as floppy disks, hard disks, tape, CD-ROM, etc. or other devices that use optical, magnetic or other recording material. Main memory 38 stores programs such as a computer's operating system and currently running application programs. In some implementations, portions of main memory 38 may also be used for displaying images through a display device.

Input device 24 and output device 26 are typically peripheral devices connected by bus structure 32 to computer 22. Input device 24 may be a keyboard, pointing device, pen, joystick, head tracking device or other device for providing input data to the computer.

Output device 26 may be a display device, printer, sound device or other device for providing output data from the computer.

The communication device 25 can include any of a variety of peripheral devices that enable computers to communicate. For example, the communication device can include a modem or a network adapter (25).

The auxiliary processing device 27 refers generally to a peripheral with a processor for enhancing the performance of the computer. One example of an auxiliary processing device is a graphics accelerator card.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the art.

The invention may be implemented in any of a number of well-known computer systems. For instance, the invention may be implemented in a personal computer (PC), such as IBM-AT compatible computers or computer systems based on the 80386, 80486, or Pentium processors from Intel Corporation. Alternatively, the invention may be implemented on any number of computer workstations, such as machines based on a RISC (reduced instruction set computing) architecture. The above systems serve as examples only and should not be construed as limiting the type of computer system in which the invention may be implemented.

FIG. 2 is a block diagram illustrating the architecture of a display device interface 50 in which an embodiment of the invention is implemented. This diagram illustrates relationships between application programs ("applications") 52, the display device interface 50, the hardware abstraction layer 54, and the display hardware 56. Applications 52 access the display hardware 56 through the display device interface 50, which serves as a device independent interface to the display hardware 56. The display device interface 50 performs parameter validation, memory management of the video memory, and bookkeeping for the interface. We describe specific features of the interface in further detail below.

The HAL (hardware abstraction layer) 54 is a hardware dependent interface to the display hardware 56. In this embodiment, the HAL includes only hardware specific code. It can be an integral part of the display hardware 56, or in the alternative, can be implemented in software on the host computer (22 in FIG. 1, for example). In the latter case, the HAL is typically implemented as a dynamic linked library (DLL). The HAL is implemented by and available from the manufacturer of the display card or chip.

The display device 50 interface can optionally include a hardware emulation layer (HEL) 58 to emulate display hardware features if they are not available in the display hardware.

The display hardware 56 includes the hardware devices within and/or coupled to the host computer that are responsible for displaying visual data including 2D and 3D rendered graphics and animation, video, text and still images.

Figure 3C:
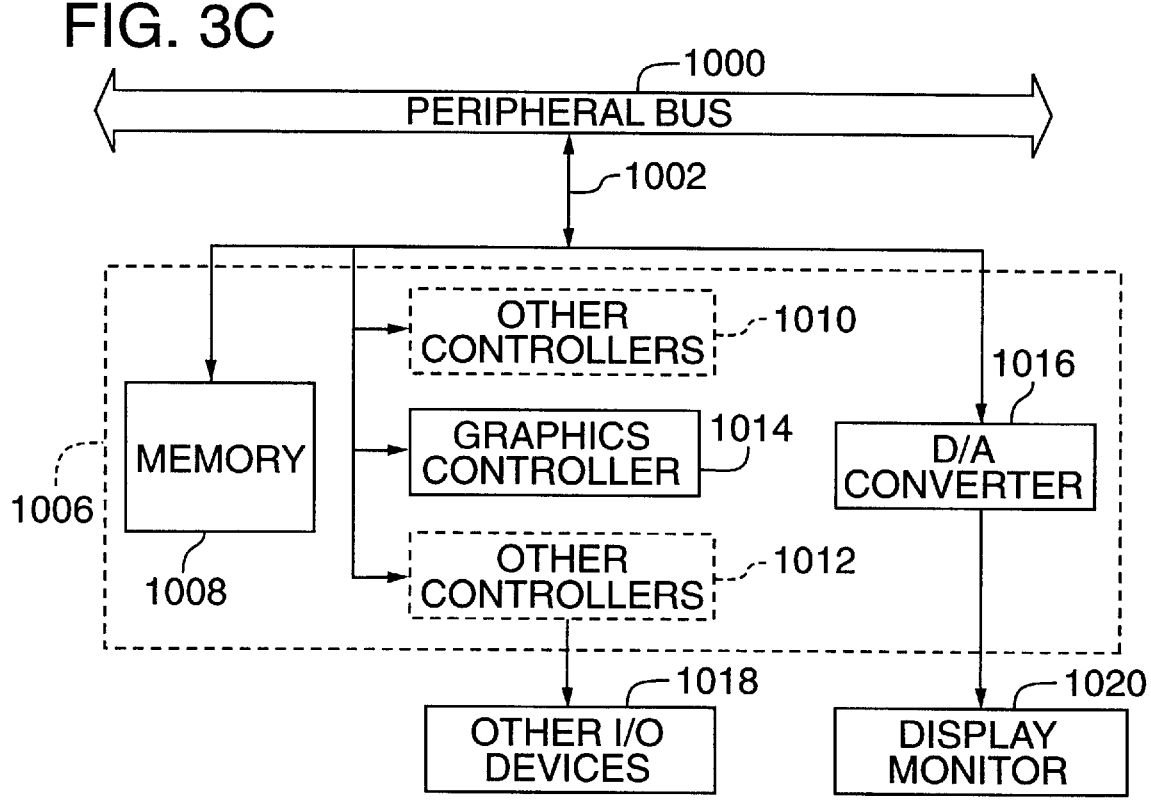
Figure 3D:
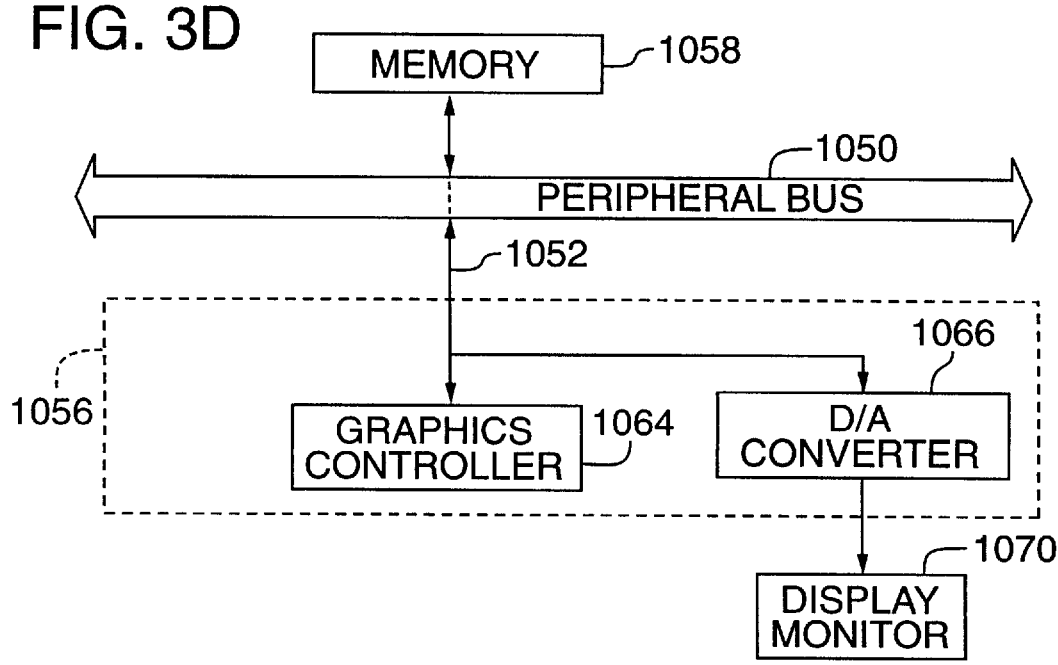

FIGS. 3A, 3B, 3C, and 3D are block diagrams showing four examples of display device architectures. FIG. 3A illustrates the architecture of a video card 70 which includes video memory implemented with DRAM (dynamic random access memory) 72. FIG. 3B illustrates the architecture of a display card 74 which includes video memory implemented with VRAM (video random access memory) 76. The video cards shown in FIGS. 3A and 3B represent only two examples of video cards with significant on board memory in common use today. For example, there are numerous types of RAM (random access memory) used on video cards. VRAM and DRAM are just two common examples. The display device interface 50, shown generally in FIG. 2, is designed to be compatible with a wide variety of display controllers whether implemented in a video card, in a video chip in the computer, or some other configuration. FIG. 3C illustrates the architecture of a multimedia card where the memory used by the display card is shared with other accelerators. FIG. 3D illustrates the architecture of a display card where the memory used by the display card is shared with the host processor. The display device interface is intended to work across any of these architectures, combinations of them, or other architectures for storing and composing pixmaps onto a display device.

The video card in FIG. 3A includes as its basic elements a graphics controller 78, video memory 72 implemented with DRAM, and a digital-to-analog converter 80. In this type of video card, each of these elements share a common bus 82. On one side, the video card is connected to a bus 84 on the host computer via a bus interface 86. On the other side, the video card is connected to a physical display device such as a display monitor 88. To generate the video display, the video card 70 receives image data and display commands from the host computer (22, for example) and controls the transfer of image data to a display monitor 88. The graphics controller 78 is responsible for acceleration and other graphics operations. When the digital-to-analog converter 80 needs to take the digitally represented image data from the DRAM and send it to the monitor, the graphics controller 78 is placed on hold until the DAC 80 finishes its task.

The video card 74 in FIG. 3B includes a graphics controller 90, video memory 76 implemented with VRAM, and a DAC 92. One significant difference between the design of this card and the card in FIG. 3B is that the graphics controller 90 and DAC 92 access the VRAM 76 through separate ports (94, 96). Coupled to a peripheral bus 98 of the host computer via a bus interface 100, the video card 74 receives image data and commands from its host and controls the display of image data stored in the video memory 76. Since the VRAM is dual ported, the DAC 92 can transfer image data to the monitor 102 as the graphics controller 90 performs operations on other image data in the video memory.

The video card 1006 in FIG. 3C includes a graphics controller 1014, "video" memory 1008 (which is not specific to any particular technology used to implement the memory), and a DAC 1016. One significant difference between the design of this card and the card in FIG. 3B is that the graphics controller 1014 shares the "video" memory with other controllers 1010/1012 and the DAC 1016. The other controllers 1012 are sometimes used to control other peripherals, including I/O devices 1018 such as a mouse, track ball, joy stick, or sound card. There are many memory architectures for these types of cards and the device display interface supports all of them. Coupled to a peripheral bus 1000 of the host computer via a bus interface 1002, the video card 1006 receives image data and commands from its host and controls the display of image data stored in the "video" memory 1008. Arbitration between other controllers can be handled either in the HAL or by the hardware.

The video card 1056 in FIG. 3D includes a graphics controller 1064, "video" memory 1058 (which is not specific to any particular technology used to implement the memory), and a DAC 1066. One significant difference between the design of this card and the card in FIG. 3B is that the graphics controller 1064 shares the "video" memory with the host processor and the DAC 1066. There are many memory architectures for these types of cards and the device display interface supports all of them. Coupled to a peripheral bus 1050 of the host computer via a bus interface 1052, the video card 1056 receives image data and commands from its host and controls the display of the image data on the display monitor 1070. Arbitration between other peripherals on the bus can be handled either in the HAL, by the video card 1056, by the operating system, or the bus.

The display device interface 50 shown in FIG. 2 acts as an interface to display hardware such as the video cards (70, 74, 1006, 1056) illustrated in FIGS. 3A, 3B, 3C and 3D. The display device interface 50 enables applications to access video memory (72, 76, 1008, 1058, for example), including both off screen and on screen memory. It also gives the applications access to special purpose graphics hardware (78, 90, 1014, and 1064, for example), where available, to enhance performance. In cases where the underlying graphics hardware does not support a requested service, the interface can potentially emulate the service through the software in the HEL 58.

The display interface supports a generalized flip function. The flip function is "general" because it allows applications to flip more that just the screen display, and because a client other than the display device can act as the consumer of the flip. To enable an application to flip images other than the display screen, the display interface creates and manages flippable surfaces. As explained further below, a surface can represent an on or offscreen image, a texture, an overlay, an alpha buffer, or a Z buffer, for example. On the client side, the client can include any of a number of display devices in the computer system, a 3D graphics rendering system, another application, the display device driver in the operating system, etc.

The display device interface includes a number of features that support generalized flipping of surfaces. One feature is a service to allocate surface memory to hold image data and create a surface structure to manipulate the associated surface memory. Another feature is a service that performs a flipping operation on a surface structure in response to a request from an application. Additional features include services that synchronize access to surfaces.

In allocating memory for a surface, the interface uses either the video memory or system memory. In general, the interface attempts to use video memory first, and then uses system memory if the video memory is insufficient. An application can also specify that an image is to reside in system memory or video memory. When we use the term "memory" below, we intend to include either system or video memory.

Surfaces

In the context of the display device interface shown in FIG. 2, a "surface" is an image or an array of alpha or Z values corresponding to pixels in an image. More specifically, a surface can be an array of pixel values (pixmap or bitmap), an array of Z values or an array of alpha values. The surface memory is an area in memory (either system or video memory) that holds the this image data. The surface structure is a data structure that defines such things as the size, height, width of the surface as well as what type of surface the underlying surface memory holds. The surface memory can hold a pixmap, for example, either for display on the screen of the monitor or as an offscreen work area.

A surface can also represent an alpha buffer or Z buffer. Alpha and Z buffers are just different types of surfaces. An alpha buffer is a surface that comprises an array of alpha values. Each alpha value describes the degree to which a corresponding pixel is transparent. A Z buffer is a surface that comprises bit depth information used to determine whether corresponding pixels are visible or are obscured.

In one implementation of the display interface shown in FIG. 2, a surface structure can represent a variety of different types of images as well as images in different formats. One typical form of a surface is a pixmap that covers the entire display screen of the monitor. This pixmap is sometimes referred to as the display image or display screen. In addition to representing a display image, a surface can be an overlay or a sprite. An overlay and a sprite refer to an image layer that is composited with another image layer. An overlay typically covers less than the entire display screen, but can be the same size as the display screen in some cases. When overlays are composited with other pixmaps, they typically have a depth value or Z order associated with them so that the display device interface or underlying hardware can determine how to composite them. The pixels in an overlay may also have associated alpha values that define their transparency. This transparency information is used along with the depth data or Z order to composite the pixel values in a source and destination image layer.

A surface can also be a texture map. A texture map is a two dimensional image that is mapped to the surface of a 3D graphical model. To summarize briefly, the process of texture mapping involves taking one or more samples from the texture map and computing the contribution of these samples on a pixel in a target image. The sampling process can be as simple as taking the nearest sample to a point mapped from the target back into the texture map. Alternatively, the sampling process can involve interpolating between samples in the texture map or filtering samples over a region in the texture map. A surface can store a texture map in different formats including a MIP (multum in parvo) map format. In a MIP mapped texture, several versions of an image are stored at different levels of detail.

A primary surface represents the pixmap image that the user is currently viewing on the display screen. More specifically, the primary surface is the surface that the display hardware is currently reading, converting to analog values, and displaying on the monitor. In these circumstances, the display device is the client of the surface. Since devices or software other than the display device can act as the client, the designation of a surface as a primary surface specifies that it is to be used by the display device as opposed to other components in the system such as a 3D rendering system or other graphics processing device. The designation as a "primary" surface also differentiates the surface from an "offscreen" surface, which is not displayed directly but can be used to construct a display image.

In many cases, an image may be constructed from arrays of related pixel data stored at different memory locations. For instance, an alpha buffer at one memory region may store an array of alpha values corresponding to an array of pixel values stored at another memory region. As another example, a Z buffer at one memory region may correspond to array of pixel values stored at another memory region. One embodiment of the display device interface manages the relationship between associated surface by creating a complex surface structure. The complex structure includes two or more surfaces inter-related by an attachment link. The surfaces can be pixmaps, one or more pixmaps and an alpha buffer, one or more pixmaps and a Z buffer, as well as a variety of other combinations of surfaces.

For example, the display device interface can maintain a pixmap with an associated alpha buffer by creating a complex surface structure that represents two surfaces: a surface holding a pixmap, and an attached surface holding the alpha buffer. Surface structures representing the pixmap and alpha buffer reference each other via an attachment link. As another example, the display device can maintain a pixmap with an associated Z buffer. In this case, the complex structure manages two regions of surface memory, one holding the pixmap, and another holding the Z buffer. Like the example above, the two surfaces, surface structures representing the pixmap and the Z buffer, reference each other via an attachment link. In one implementation of the interface, one of the structures in a complex surface structure serves as the root surface. Other surfaces are attached to the root surface to form the complex surface. The complex structure can then only be destroyed by destroying the root surface.

Flipping Surfaces

One embodiment of the display device interface uses a complex surface to support flipping surfaces. Front and back buffers are types of surfaces that are used to support double buffering or buffering among more than two regions in memory. The display device interface supports double buffering as well as buffering among more than two surfaces by creating a complex surface structure comprising a front buffer and one or more back buffers. The front buffer typically holds a completed pixmap that is ready for use by some client of the interface. A back buffer can hold a completed pixmap that is queued for use by a client, or a pixmap that is under construction.

Surface structures that support double or multiple buffering are designated as flipping structures. This means that the front buffer can be swapped or "flipped" with a back buffer. To create a flipping structure in one implementation of the display interface, an application invokes a function in the interface responsible for creating a surface structure and designates it as a flipping structure.

Figure 4A:
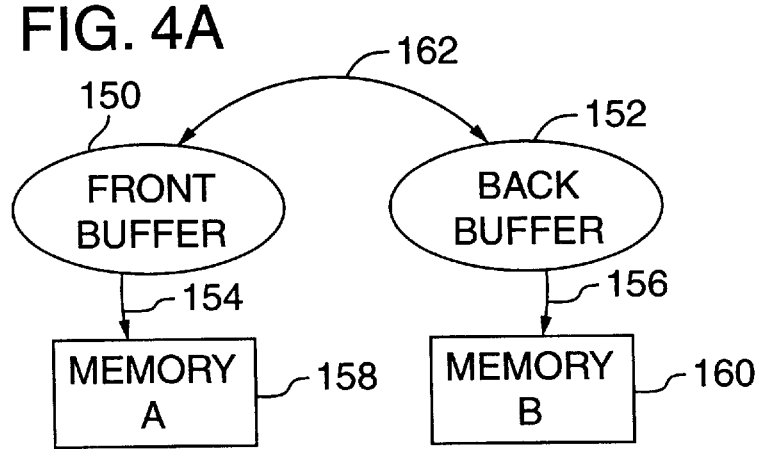
FIGS. 4A and 4B are diagrams illustrating an example of a flipping structure with a front and back buffer.
Figure 4B:
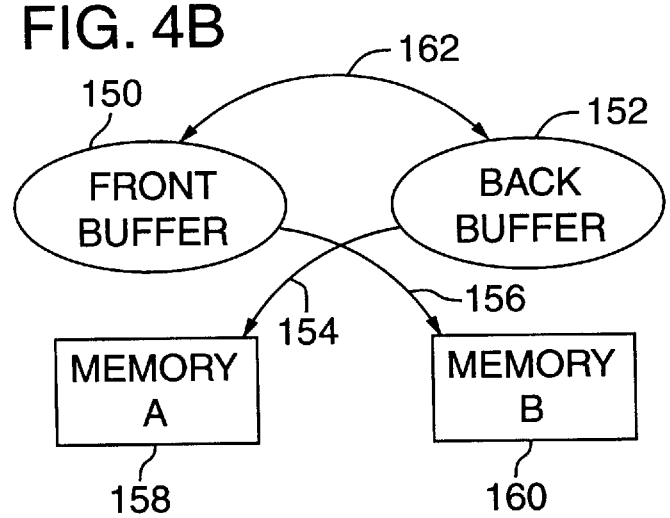

To support double buffering, for example, the application requests the interface to create a surface structure comprised of at least two surfaces, including a front and back buffer. FIGS. 4A and 4B are diagrams illustrating an example of a flipping structure with a front and back buffer. As shown in FIG. 4A, both the front and back buffer structures 150, 152 refer to corresponding regions of memory: a reference pointer 154 in the front buffer structure refers to region A 158, while a reference pointer 156 in the back buffer structure refers to region B 160. The front and back buffer structures are linked to each other with an attachment link 162.

The display interface includes a flip function that operates on the flipping structure. In response to a single call to this flip function, the surface structures including the front and back buffer structures 150 and 152, remain constant from the perspective of the application. If the application wishes to draw into a surface, it performs its operations on the surface that it is concerned with and does not have to track the specific address of the underlying surface memory (158, 160) that holds the surface before and after a flip operation. The flip function controls the details of the flip operation by determining when the underlying surface memory can be swapped and by keeping track of the specific location of the underlying surface memory.

To perform a flip on a structure with one front and one back buffer, the interface swaps or "flips" the reference pointers 150, 152. After the flip, the front buffer reference pointer 156 refers to region B 160 and the back buffer reference pointer 154 refers to region A 158.

Access Synchronization

The display device interface includes services to synchronize access to surfaces. One embodiment of the display interface includes a locking service. Locking and unlocking are services for controlling access to a surface. For example, in the context of a flipping structure, the locking services can control a producer's access to a back buffer, on one side, and a client's access to the front buffer on the other side. The producer is typically an application but can generally be any process running in the host computer of the display device interface or another piece of hardware. The client, in a typical case, is the display controller, but can also be a application or process executing in the host computer of the display device interface or another piece of hardware.

In one specific implementation, the display device interface provides lock and unlock functions to control access to a surface. In addition, operations that access a surface such as a flipping operation or a bit block transfer, implicitly lock (or prevent access to) the surface or surfaces that they affect until the operations are completed.

The flip operation is an example of this implicit locking of a surface. The display device interface prevents applications from touching the front buffer during the actual duration of the flip call. It prevents applications from touching the back buffer until the flip (which is asynchronous) is actually accomplished. In order to set up a flip both the front buffer and the back buffer need to be unlocked (and no application is allowed to lock those surfaces during a flip call). Once the display device interface has swapped the memory pointers so that the back buffer points at what was previously the front buffer in a flipping structure, the display device interface does not let users access the back buffer until it determines that whatever device was accessing the front buffer is really done accessing the bits that are now pointed at by the back buffer.

Producer and Client Access to Flipping Structure

Figure 5:
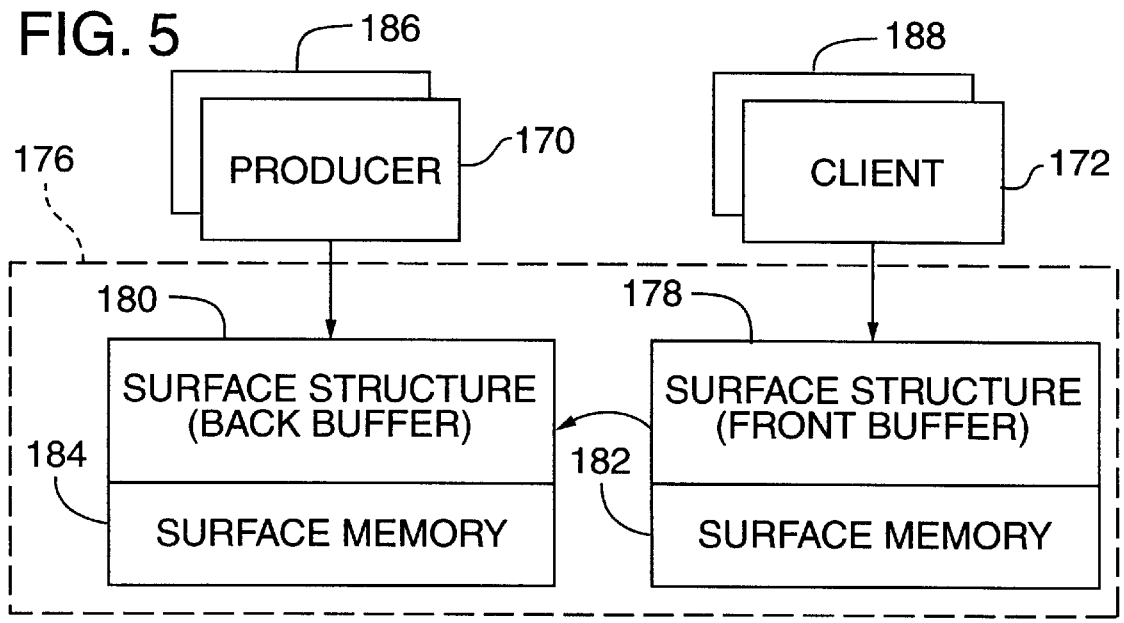
FIG. 5 is a diagram illustrating an example a general flipping structure that shows the relationship between a producer and client of the flipping structure.

FIG. 5 is a diagram of a general flipping structure showing the relationship between a producer 170 and client 174 of the flipping structure 176. This particular flipping structure includes only a single front and back buffer 178, 180, respectively. The front buffer 178 represents a first region of surface memory 182, while the second buffer 180 represents a second region of surface memory 184. Additional back buffers can be created by chaining back buffer structures to the front buffer. It is also possible to have more than one producer 186 drawing to the back buffer, and more than one client 188 accessing the front buffer.

The producer is responsible for drawing a surface to the back buffer. To accomplish this, it locks the back buffer or a portion of it, manipulates the surface in the back buffer, and then unlocks the back buffer or at least the portion it was using.

The client reads the surface in the front buffer and uses it to generate an image. For example, if the client is the display controller, it can read a pixmap in the front buffer and display it. If the client is a 3D rendering system and the surface in the front buffer is a texture map, the client can read the front buffer and map the surface to a 3D graphical model.

When the client is accessing the front buffer, it has a lock on at least a portion of the surface memory 182 currently serving as the front buffer. The lock means that other producers or clients cannot manipulate the portions of the front buffer that the client is currently accessing. A client can explicitly request a lock of the front buffer by invoking the lock service in the display device interface.

To get direct access to a surface, a client gets a lock to the surface memory holding the surface. The client requests this lock explicitly by invoking the lock function on the surface structure representing the surface memory. For a flip call, the front buffer is locked during the duration of the call. The back buffer is locked until the asynchronous flip occurs. This is when the client finishes reading the actual surface memory that served as the front buffer before the flip call.

Figure 6:
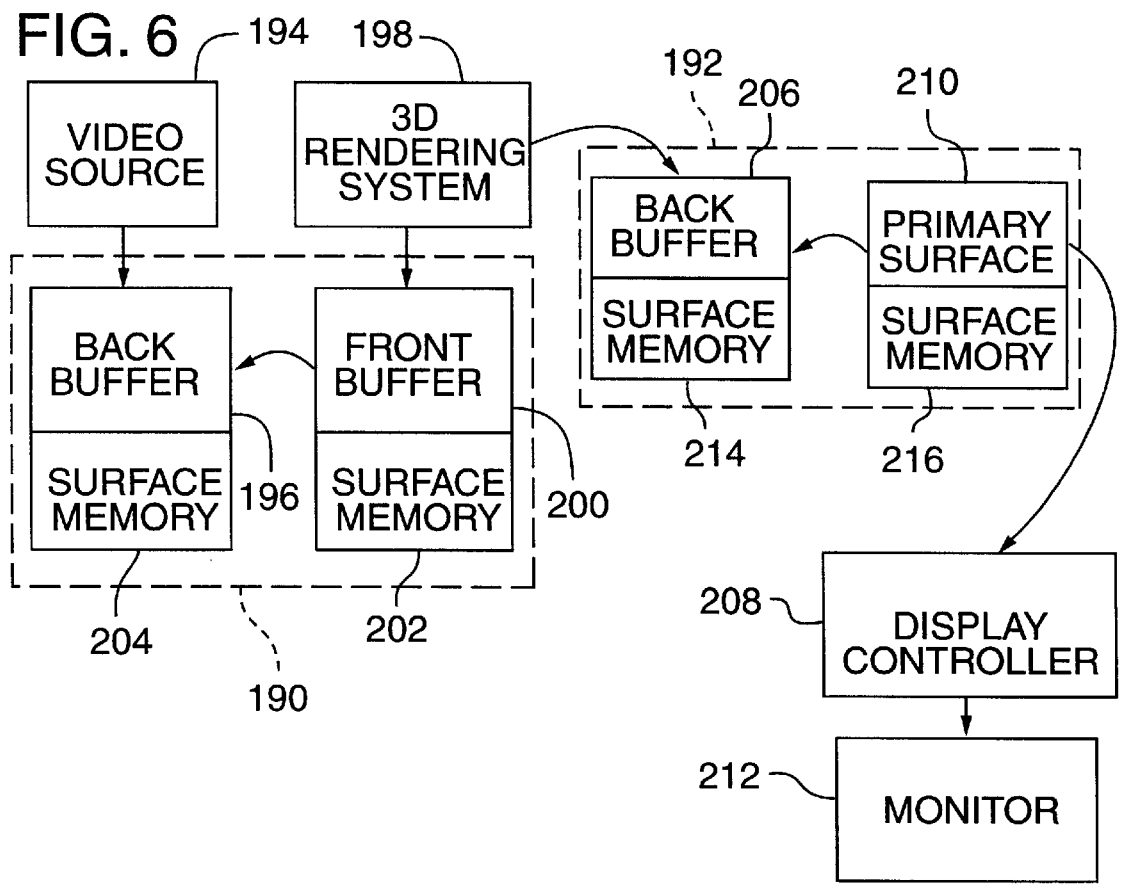
FIG. 6 illustrates a specific example of how the flipping structure can support video texture mapping.

FIG. 6 illustrates a specific example of how the a flipping structure can support video texture mapping. In this example, there are two flipping structures: one representing a flipping structure 190 for a texture map; and another representing a flipping structure 192 for a primary surface. This particular architecture supports video texture mapping where frames in a stream of video are mapped to the surface of a graphical object being rendered by a 3D rendering system.

As an overview, the video stream originates from the video source 194, which sequentially writes frames of video to the back buffer 196 of the texture flipping structure. The 3D rendering system 198 reads the front buffer 200 of the texture flipping structure 190 to map the current frame of video to the surface of a graphical object being rendered. When a complete frame is drawn to the back buffer 196, the flipping function flips the underlying surface memory 202, 204 of the front and back buffers 198, 196.

The 3D rendering system 198 renders a graphical scene to the back buffer 206 of the primary flipping structure 192. While the 3D rendering system renders the next frame to be displayed in the back buffer 204, the display controller 208 scans the current frame in the front buffer (primary surface) 210 to the display monitor 210. In this example, the 3D graphics rendering system 198 is responsible for invoking the flip operation in the display device interface to exchange the surface memory 214, 216 of the primary flipping structure 192.

The video source in the above example can be implemented using a video decompressor capable of decompressing its images to a surface and calling Flip in between frames. An example would be Microsoft's ActiveMovie. Any 3D application programming interface (API) capable of reading its texture pixels out of a surface can serve as the client. An example would be Microsoft's Direct3D or Reality Lab. OpenGL from Silicon Graphics, Inc. can also be adapted for this particular application.

Video texture mapping is supported using the following approach. In the following discussion, the references to "lock" and "unlock" refer to the access synchronization functions in one implementation of the display device interface. At initialization, a flipping structure is created that has the capability of being a texture. The video decompressor (for example ActiveMovie) is pre-initialized with the name of a movie file that it is to play back and is then told to playback the movie into the back buffer of this structure.

To begin, the video decompressor plays a single frame. It does this by locking the back buffer and writing the first frame of the movie into the backbuffer surface memory. It then calls Unlock to tell the device interface that it is done with the surface and then it calls Flip. Now the front buffer has a picture in it.

The 3D API has been pre-initialized with all of the standard information required to create a scene. The 3D API is now told to texture map the front buffer of the flipping structure onto the mesh in the scene (for example a ball). The video decompressor is now told to play the rest of the movie. The 3D API calls Lock on the front buffer and reads the pixels out of the front buffer as dictated by its texture mapping algorithm (there are well defined algorithms for doing this in the industry). When it is done texture mapping the ball, it calls Unlock.

The Video decompressor calls Lock on the back buffer and starts decompressing the next frame of video. When it is done making the changes to the back buffer required to create the next frame of video, it calls Unlock. After that it calls Flip to hand the next frame of video to the client (in this case the 3D API who is using it for texture mapping). The Flip call will return an error parameter (saying it is still drawing) if the 3D API has requested and maintains a lock on the front buffer when the Flip is called. The video decompressor can either call the Flip repeatedly or call the Flip function and tell it to wait and retry.

The Flip call will wait, preventing other applications from locking the front or back buffers of the flipping structure, until the 3D API calls Unlock. At this point, after the 3D API has told the device interface that it is done with the front buffer, the waiting flip command will execute. The memory surfaces will be swapped and the next time the client (3D API) calls Lock on the front buffer, it will be accessing the next frame of the movie. As soon as the flip call returns the video decompressor looks at how much time has passed and decides how many frames to skip (if any) before starting to decompress the next frame of the movie into the backbuffer. This is how synchronization is achieved between the producer and the client. In this example, the client always has a complete frame of video to texture map (display) no matter how slow (or fast) the video decompression (producer) is creating them.

The functions in the display device interface described above can be implemented in a variety of different ways. Either procedural or object oriented programming approaches can be used. In one specific embodiment, surface structures and functions relating to them are implemented using an object oriented approach.

In this embodiment, the display device interface shown in FIG. 2 is implemented as an object that represents the underlying display device hardware. There can be one instance of a display device object for every logical display device in operation. For example, a software development environment may have two monitors, one running a game using the display device interface shown in FIG. 2, and another running the development environment using an alternative display device interface such as GDI (the graphics device interface), which is part of the Windows® 95 operating system from Microsoft Corporation.

The display device object in this particular architecture owns all of the global attributes of the display device (e.g. video card) that it represents. It controls default values for the global attributes such as the color key values, color depth, resolution and the hardware's display mode. As explained further below, it also can control a default color table or palette for the primary surface.

In this implementation of the display device interface, the display device object includes a number of member functions to create additional objects, which provide services through their respective member functions. These objects include a surface object, a palette object, and a clipper object.

A surface object is a specific way to implement the surface structures described above. A surface object, therefore, represents a region in memory that holds a pixmap, an alpha buffer, or a Z buffer, for example. The member functions of the surface object provides services for managing and manipulating surfaces. As explained in further detail below, these services include functions to flip surfaces, attach or detach a surface, perform a bit block transfer, list surfaces attached to a given surface, return capabilities of the surface, return the clipper object attached to the surface, etc.

A palette object is an object that represents a color table. Through a palette object, an application can gain access to and manipulate the color table of the display device. A palette object allows direct manipulation of the palette table as a table. This table can have, for example, 16 or 24 bit RGB entries representing the colors associated with each of the indexes or, for 16 color palettes, it can also contain indexes to another 256 color palette. Entries in these tables can be retrieved with a get entries member function and changed with set entries member function.

In this implementation, a palette object becomes associated with a surface object when attached to it. Palette objects can be attached to the pixmap surfaces described above such as the primary surface, an offscreen surface, a texture map, and an overlay. Each of the palette objects attached to these surfaces can be different.

One embodiment of the display device interface simplifies color specification for surfaces by supporting default palettes. If a surface object does not have an attached palette, it automatically defaults to the palette of the primary surface. In this architecture, the display device object controls the default palette.

The clipper objects represent clip lists. A clipper object can be attached to any surface. In one implementation of the display device interface for a windowing environment, a window handle can be attached to a clipper object. Using the information provided by the window handle, the display device interface can update the clip list of the clipper object with the clip list of the window as the clip list for the window changes.

In order to create a surface, palette or clipper object, the application first creates an instance of a display device object. The application can then create one of these objects by invoking one of the display device object's member functions to create the object.

Figure 7:
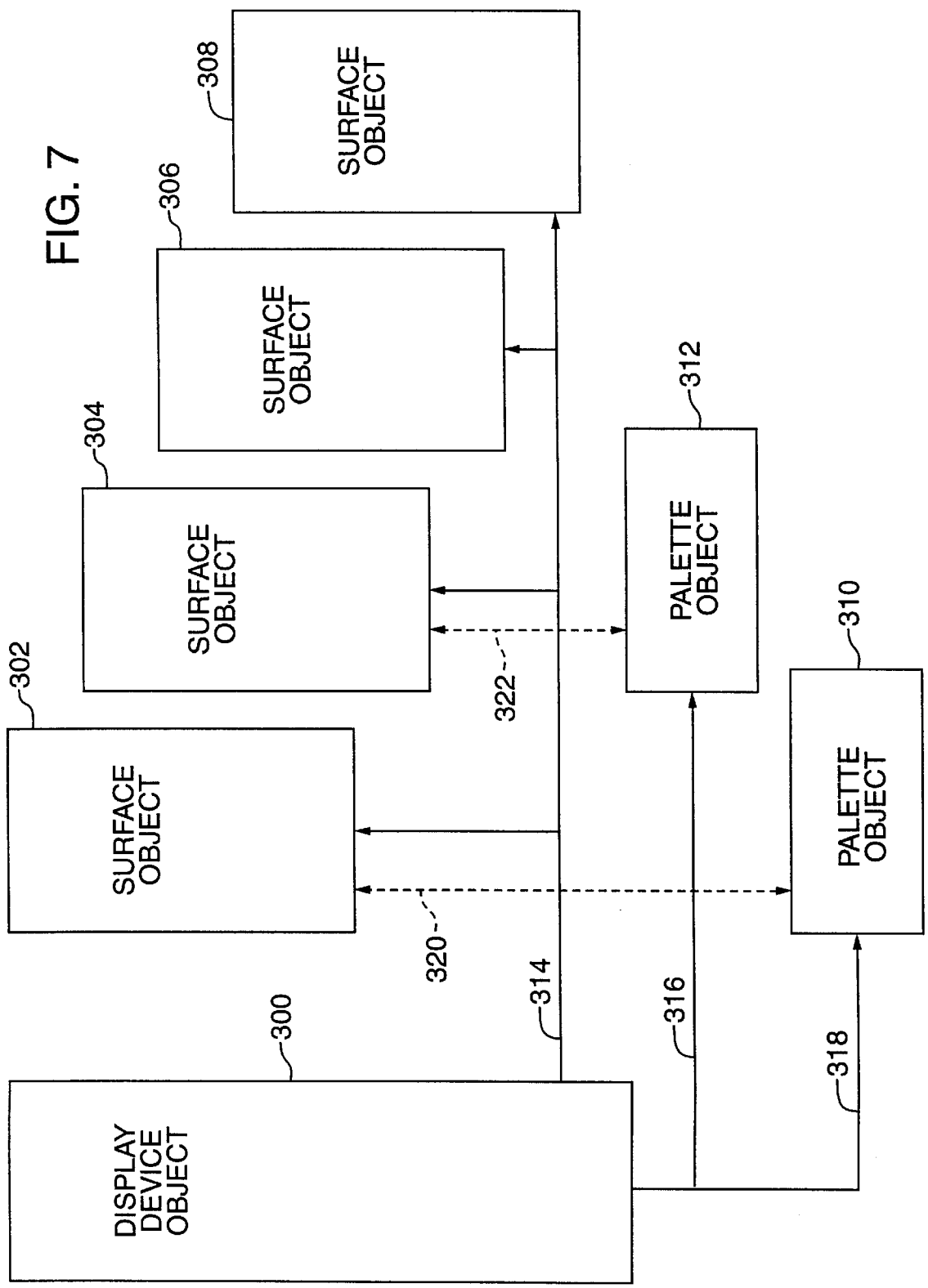
FIG. 7 is a block diagram illustrating the object architecture in one implementation of a display device interface.

FIG. 7 is a block diagram illustrating the object architecture in one embodiment. The display device object 300 for a display device is the creator and owner of the surface objects 302–308 and palette objects 310–312 for that display device. It is responsible for managing all of the objects that it creates. This ownership relationship is represented by the solid arrows 314, 316, 318 from the display device object 300 to its surface objects 302–308 and palette objects 310–312. The palette objects 310–312 are attached to associated surface objects via attachment links 320, 322.

To create a surface object in this architecture, the application calls the display device object's "create surface" member function. In response, the CreateSurface member function creates a surface object that represents a surface and the underlying surface memory that holds it. The member function creates a surface object with the attributes and capabilities specified by the application. If the application requests a complex surface (a surface structure including more than one surface), then the member function in this implementation creates instances of surface objects for each surface.

The application can specify the attributes of the surface object by setting fields in a surface description structure that it passes to the create surface member function. One implementation of this structure and a description of its fields is set forth below:

```
typedef struct _DDSURFACEDESC{
    DWORD      dwSize;
    DWORD      dwFlags;
    DWORD      dwHeight;
    DWORD      dwWidth;
    LONG       lPitch;
    union
    {
       DWORD      dwBackBufferCount;
       DWORD      dwMipMapCount;
    }
    DWORD      dwZBufferBitDepth;
    DWORD      dwAlphaBitDepth;
    DWORD      dwReserved;
    LPVOID     lpSurface;
    DDCOLORKEY    ddckCKDestOverlay;
    DDCOLORKEY    ddckCKDestBlt;
    DDCOLORKEY    ddckCKSrcOverlay;
    DDCOLORKEY    ddckCKSrcBlt;
    DDPIXELFORMAT    ddpfPixelFormat;
    DDSCAPS       ddsCaps;
} DDSURFACEDESC, FAR* LPDDSURFACEDESC;
```
dwSize
    Size of the structure. Initialized prior to use.
dwFlags
    DDSD_CAPS    ddsCaps field is valid.
    DDSD_HEIGHT    dwHeight field is valid.
    DDSD_WIDTH    dwWidth field is valid.
    DDSD_PITCH    lPitch is valid.
    DDSD_BACKBUFFERCOUNT    dwBackBufferCount is valid.
    DDSD_ZBUFFERBITDEPTH    dwZBufferBitDepth is valid.
    DDSD_ALPHABITDEPTH    dwAlphaBitDepth is valid.
    DDSD_LPSURFACE    lpSurface is valid.

-continued

DDSD_PIXELFORMAT    ddpfPixelFormat is valid.
    DDSD_CKDESTOVERLAY    ddckCKDestOverlay is valid.
DDSD_CKDESTBLT    ddckCKDestBlt is valid.
DDSD_CKSRCOVERLAY    ddckCKSrcOverlay is valid.
DDSD_CKSRCBLT    ddckCKSrcBlt is valid.
DDSD_ALL    All input fields are valid.
dwHeight
    Height of surface.
dwWidth;
    Width of input surface.
lPitch
    Distance to start of next line (return value only).
dwBackBufferCount
    Number of back buffers.
dwMipMapCount
    Number of mip-map levels.
dwZBufferBitDepth
    Depth of Z buffer.
dwAlphaBitDepth
    Depth of alpha buffer.
dwReserved
    Reserved.
lpSurface
    Pointer to the associated surface memory.
ddckCKDestOverlay
    Color key for destination overlay use.
ddckCKDestBlt
    Color key for destination blit use.
ddckCKSrcOverlay
    Color key for source overlay use.
ddckCKSrcBlt
    Color key for source blit use.
ddpfPixelFormat
    Pixel format description of the surface.
ddsCaps
    Surface capabilities.

The surface object maintains a list of its capabilities in a surface capabilities structure. As shown in the implementation above, this structure is part of the surface description structure. One implementation of the surface capabilities and a description of its fields follows below:

```
typedef struct _DDSCAPS{
    DWORD      dwCaps;
} DDSCAPS, FAR* LPDDSCAPS;
```
dwCaps
DDSCAPS_3D
    Indicates that this surface is a front buffer, back buffer, or texture map that is being used in conjunction with a 3D rendering system.
DDSCAPS_ALPHA
    Indicates that this surface contains alpha information. The pixel format must be interrogated to determine whether this surface contains only alpha information or alpha information interlaced with pixel color data (e.g. RGBA or YUVA).
DDSCAPS_BACKBUFFER
    Indicates that this surface is a backbuffer. It is generally set by the create surface function when the DDSCAPS_FLIP capability bit is set. It indicates that this surface is THE back buffer of a surface flipping structure. DirectDraw supports N surfaces in a surface flipping structure. Only the surface that immediately precedes the DDSCAPS_FRONTBUFFER has this capability bit set. The other surfaces are identified as back buffers by the presence of the DDSCAPS_FLIP capability, their attachment order, and the absence of the DDSCAPS_FRONTBUFFER and DDSCAPS_BACKBUFFER capabilities. The bit is sent to the create surface function when a stand-alone back buffer is being created. This surface could be attached to a front buffer and/or back buffers to form a flipping surface structure after the call to the create surface function.
DDSCAPS_COMPLEX
    Indicates a complex surface structure is being described. A complex surface structure results in the creation of more than one surface. The additional surfaces are attached to the root surface. The complex structure can only be destroyed by destroying the root.

-continued

DDSCAPS_FLIP
    Indicates that this surface is a part of a surface flipping structure. When it is passed to create surface function, the DDSCAPS_FRONTBUFFER and DDSCAPS_BACKBUFFER bits are not set. They are set by the create surface function on the resulting creations. The dwBackBufferCount field in the DDSURFACEDESC structure must be set to at least 1 in order for the create surface function call to succeed. The DDSCAPS_COMPLEX capability must always be set when creating multiple surfaces through create surface function.

DDSCAPS_FRONTBUFFER
    Indicates that this surface is THE front buffer of a surface flipping structure. It is generally set by create surface function when the DDSCAPS_FLIP capability bit is set. If this capability is sent to the create surface function, then a stand-alone front buffer is created. This surface will not have the DDSCAPS_FLIP capability. It can be attached to other back buffers to form a flipping structure.

DDSCAPS_HWCODEC
    Indicates surface should be able to have a stream decompressed to it by the hardware.

DDSCAPS_LIVEVIDEO
    Indicates surface should be able to receive live video.

DDSCAPS_MODEX
    Surface is a 320×200 or 320×240 ModeX surface.

DDSCAPS_OFFSCREENPLAIN
    Indicates that this surface is any offscreen surface that is not an overlay, texture, Z buffer, front buffer, back buffer, or alpha surface.

DDSCAPS_OWNDC
    Indicates surface will have a DC associated long term.

DDSCAPS_OVERLAY
    Indicates that this surface is an overlay. It may or may not be directly visible depending on whether or not it is currently being overlayed onto the primary surface. DDSCAPS_VISIBLE can be used to determine whether or not it is being overlayed at the moment.

DDSCAPS_PALETTE
    Indicates that unique DirectDrawPalette objects can be created and attached to this surface.

DDSCAPS_PRIMARYSURFACE
    Indicates that this surface is the primary surface. The primary surface represents what the user is seeing at the moment.

DDSCAPS_PRIMARYSURFACELEFT
    Indicates that this surface is the primary surface for the left eye. The primary surface for the left eye represents what the user is seeing at the moment with the user's left eye. When this surface is created the DDSCAPS_PRIMARYSURFACE represents what the user is seeing with the user's right eye.

DDSCAPS_SYSTEMMEMORY
    Indicates that this surface memory was allocated in system memory.

DDSCAPS_TEXTURE
    Indicates that this surface can be used as a 3D texture. It does not indicate whether or not the surface is being used for that purpose.

DDSCAPS_VIDEOMEMORY
    Indicates that this surface exists in video memory.

DDSCAPS_VISIBLE
    Indicates that changes made to this surface are immediately visible. It is always set for the primary surface and is set for overlays while they are being overlayed and texture maps while they are being textured.

DDSCAPS_WRITEONLY
    Indicates that only writes are permitted to the surface. Read accesses from the surface may or may not generate a protection fault, but the results of a read from this surface will not be meaningful.

DDSCAPS_ZBUFFER
    Indicates that this surface is the Z buffer. The Z buffer does not contain displayable information. Instead, it contains bit depth information that is used to determine which pixels are visible and which are obscured.

The create surface function can be used to create a variety of different surface structures. One example, as explained generally above, is a primary surface. When an application requests the interface to create a primary surface in this implementation, the interface creates a surface object to access the surface memory currently being used to generate the display image. This enables the application to access surface memory that is already being used by another process in the computer. For example in the context of a computer running the Windows Operating System, GDI may currently be using this surface memory to control the display. To create a primary surface in this example, the application fills in the relevant fields of the surface description structure passed to the interface on the create surface function call.

The application would fill in the fields of the surface description structure as follows:

```
DDSURFACEDESC  ddsd;
ddsd.dwSize = sizeof( ddsd );
//Tell DDRAW which fields are valid
ddsd.dwFlags = DDSD_CAPS;
//Ask for a primary surface
ddsd.ddsCaps.dwCaps = DDSCAPS_PRIMARYSURFACE;
```

Since the surface memory is already being used in the system, there is no need to specify the height and width of the primary surface.

As another example, an application can create a plain, offscreen surface. An offscreen surface can be used to store pixmaps that will be combined with other surfaces in the video card, for example. In requesting the interface to create this surface, the application might fill in the surface description structure as follows:

```
DDSURFACEDESC  ddsd;
ddsd.dwSize = sizeof( ddsd );
//Tell DDRAW which fields are valid
ddsd.dwFlags = DDSD_CAPS | DDSD_HEIGHT | DDSD_WIDTH;
//Ask for a simple offscreen surface, sized 100 by 100 pixels
ddsd.ddsCaps.dwCaps = DDSCAPS_OFFSCREENPLAIN;
dwHeight = 100;
dwWidth = 100;
```

In this implementation, the interface attempts to create this offscreen surface in video memory, and if there is not enough memory, it uses system memory.

The create surface function can be used to create a complex surface structure in a single function call. If the DDSCAPS_COMPLEX flag is set in the create surface call, one or more "implicit" surfaces will be created by the interface in addition to the surface explicitly specified. Complex Surfaces are managed as a single surface in this implementation. For example, a single call to release a complex surface will release all surfaces in the structure, and a single call to restore a surface will restore them all.

One example of a complex surface structure in this implementation is a surface structure that includes a Primary Surface and one or more back buffers that form a surface flipping environment. The fields in the DDSURFACEDESC structure, ddsd below, relevant to complex surface creation are filled in to describe a flipping surface that has one back buffer.

```
DDSURFACEDESC  ddsd;
ddsd.dwSize = sizeof( ddsd );
//Tell display device interface which fields are valid
ddsd.dwFlags = DDSD_CAPS | DDSD_BACKBUFFERCOUNT;
//Ask for a primary surface with a single back buffer
ddsd.ddsCaps.dwCaps = DDSCAPS_COMPLEX | DDSCAPS_FLIP | DDSCAPS_PRIMARYSURFACE;
ddsd.dwBackBufferCount = 1;
```

The statements in the example above construct a double-buffered flipping environment. A single call to a flip function in the display device interface exchanges the surface memory of the primary surface and the back buffer. If a BackBufferCount of "2" had been specified, two back buffers would have been created, and each call to the flip function would have rotated the surfaces in a circular pattern, providing a triple buffered flipping environment.

The surface object includes a number of member functions that enable applications to modify or get information about attached surfaces. The term, "attached surface," refers to a surface in a complex surface structure that is attached to one or more other surfaces.

To attach a surface to another, an application invokes an attach surface member function of the surface object. Examples of possible attachments include Z buffers, alpha channels, and backbuffers. Different types of surfaces can be attached to each other; for example, a flippable Z buffer can be attached to a regular flippable surface.

If a non-flippable surface is attached to another non-flippable surface of the same type, the two surfaces will become a flippable chain. If a non-flippable surface is attached to a flippable surface, it becomes part of the existing flippable chain. Additional surfaces can be added to this chain, and each call of the flip member function will cycle one step through the surfaces.

The surface object also includes a member function to detach a surface. If NULL is passed as the surface to be detached in this implementation, all attached surfaces will be detached. Implicit attachments (those formed by the interface, rather than in response to a call to the attach surface function) cannot be detached. Detaching surfaces from a flippable chain can change other surfaces in the chain. If a FRONTBUFFER is detached from a flippable chain, the next surface in the chain becomes the FRONTBUFFER and the surface following it becomes the BACKBUFFER. If a BACKBUFFER is detached from a chain, the following surface becomes a BACKBUFFER. If a plain surface is detached from a chain, the chain simply becomes shorter. If a flippable chain only has two surfaces and they are detached, the flippable chain is destroyed and both surfaces return to their previous designations.

The surface objects include a member function to retrieve an attached surface with specified capabilities. To invoke this function, it is called and passed the surface capabilities structure with the desired capabilities set.

If more than one attached surface has the desired capabilities, an application can call a member function to enumerate the attached surfaces.

Another member function of the surface object relating to attached surfaces is a function that is used to enumerate attached surfaces. When invoked by an application, this function enumerates each surface attached to a specified surface. The function invokes a call back function for each attached surface.

To support double and multiple buffering using surface objects, surface objects include a flip member function. This function call makes the surface memory associated with a back buffer surface become associated with the front buffer surface. The surface memory previously associated with the front buffer is associated with the back buffer. If there is more than one back buffer, then a ring is formed and the surface memory buffers cycle one step through this ring every time the flip function is invoked.

While the flip function adjusts the underlying surface memory in response to a flip, the surface objects in the flipping structure stay constant. For example, in the context of double buffering, an application that draws on the back buffer always uses the same surface object. The flip function switches only the surface memory underneath the surface object when a flip operation is requested.

An application or other program requesting a flip can override the default behavior of the flip function by specifying the surface structure that will act as the target of a flip. In this case, the flip function swaps the surface memory underneath the front buffer with the surface memory underneath the specified surface object.

The flip function controls when the exchange of the underlying surface memory occurs and ensures that an application does not draw to surface memory that is currently being used by a client such as a display device. In this implementation, the flip function is synchronized with the vertical blank signal. The flip function sets a register in the display hardware so that the exchange of the surface memory occurs when the display hardware performs a vertical retrace. The flip operation is asynchronous so that the application can continue processing after it calls the flip function. In the interim after the flip call and before the vertical retrace, the interface write blocks the surface memory that previously was associated with the front buffer.

If the surface memory previously associated with the front buffer is still being displayed after an application invokes the flip function, the interface does not allow the application to draw to the new back buffer. This is necessary because the new back buffer, in these circumstances, refers to the surface memory that is still being used by the display hardware. When the interface receives the vertical blank signal, this condition is resolved, and the application can now draw to the back buffer.

In the case where an application attempts to draw to a surface memory that is not available in these circumstances, the flip function returns a value indicating that the display device was still drawing to the display monitor.

When an application attempts to invoke the flip function on a surface, and the display hardware is in a state that makes it unable for the interface to complete the flip, the flip function will return an error. In this implementation, the application can avoid this response by instructing the flip function to keep trying until it is successful or some other error occurs. To accomplish this, the application calls the flip function and sets an additional flag instructing the flip function to wait and retry if the hardware is temporarily not available.

The surface object has lock and unlock member functions that allow a consumer of a surface to directly access surface memory. For the purposes of this discussion we assume that the consumer of a surface is an application, but it can in general refer to a process. To manipulate surface memory, an application calls the lock member and specifies the rectangle on the surface that it wants to access. If the application does not specify a rectangle, then the interface assumes that the application wants access to the entire rectangle.

The lock member function fills in the surface description structure with the information needed to access the surface memory. This includes the pitch (or stride) and the pixel format of the surface.

When the application or other process completes its use of a surface, it can make the surface accessible by calling the unlock member function.

A more detailed description of an implementation of the lock and unlock members follows below.

```
HRESULT Lock(
    LPDIRECTDRAWSURFACE lpDDSurface,
    LPRECT lpDestRect,
    LPDDSURFACEDESC lpDDSurfaceDesc,
    DWORD dwFlags,
    HANDLE hEvent )
```

When the an application or other process calls the lock member, it obtains a valid pointer to surface memory (lpDDSurface).

The DDSURFACEDESC structure also contains a pointer to the surface memory. It is possible to call the lock member function multiple times for the same surface object with different destination rectangles. The pointer in the DDSURFACEDESC is used to tie the calls to the lock and unlock members together.

Normally, the lock member will return immediately with an error when a lock cannot be obtained because a blit or flip is in progress. The DDLOCK_WAIT flag can be used to alter this behavior. Instead of returning with an error, the lock function will wait until it is safe to access the surface memory and then return if the DDLOCK_WAIT flag is set.

In order to prevent video memory from being video memory from being accessed by the graphics controller in the display controller during host access to a surface, the display device interface holds a lock between lock and unlock operations. The display device interface keep track of which surfaces are locked or have flips pending on them and does not allow those surfaces to be freed until the operations are complete on them. To keep track of which surfaces are locked, the dipaly interface marks the data structure representing the surface object or objects that are locked. The display device interface, in this implementation, does not allow any surfaces to be freed while the biter or 3D renderer is active (since it may otherwise degrade performance to keep track of the surfaces it is using i.e. src, dest, alpha, z etc).

In an implementation for the Windows® 95 Operating System, the lock is the Win16 lock. The Win16 lock is the critical section used to serialize access to GDI and USER. This technique allows direct access to video memory and prevents other applications from changing the mode during this access.

Rather than take the Win16 Lock which prevents the hardware from being accessed by stopping GDI from talking to it, the display device interface can put GDI in emulation mode so that it will not try to talk to the hardware while a Lock is taken. These are only two specific implementations for the Windows 95 Operating system. Other implementations are possible as well.

The parameters for the lock member function are described in further detail below.

--- lpDDSurface
    Points to the Surface structure representing the Surface.
lpDestRect
    Points to a RECT structure identifying the region of Surface that is being locked.
lpDDSurfaceDesc
    Points to a DDSURFACEDESC structure to be filled in with the relevant details about the Surface by the lock call.
dwFlags
DDLOCK_SURFACEMEMORYPTR
    The default. Set to indicate that Lock should return a valid memory pointer to the top of the specified rectangle. If no rectangle is specified then a pointer to the top of the surface is returned.
DDLOCK_EVENT
    Set if an event handle is being passed to the Lock member function.
    Lock will trigger the event when it can return the surface memory pointer requested. If multiple locks of this type are placed on a surface, events will be triggered in FIFO order.
DDLOCK_WAIT
    Normally, if a lock cannot be obtained because a Blt is in progress, a WASSTILLDRAWING error will be returned immediately. If this flag is set, however, the lock function will retry until a lock is obtained or another error, such as DDERR_SURFACEBUSY, occurs.
hEvent
    Handle to a system event that should be triggered when the surface is ready to be locked.

---

A consumer of a surface calls the unlock member function to notify the interface that the direct surface manipulations are complete.

---

HRESULT Unlock(
    LPDIRECTDRAWSURFACE lpDDSurface,
    LPVOID lpSurfaceData)

---

The unlock function returns DD_OK if successful, otherwise it returns one of the following error values:

---

DDERR_INVALIDOBJECT    DDERR_INVALIDPARAMS
DDERR_SURFACELOST    DDERR_NOTLOCKED
DDERR_GENERIC    DDERR_INVALIDRECT
lpDDSurface
    Points to the surface structure representing the surface.
lpSurfaceData

---

This is the pointer to the surface memory returned by the lock member function in the surface description structure. Since it is possible to call the lock function multiple times for the same surface with different destination rectangles, this pointer is used to tie the lock and unlock function calls together.

As set forth above, the display device interface is responsible for controlling access to surface memory. When an application makes a call to modify a surface, for example, the display device interface makes sure that it is safe to modify the underlying surface memory. For the sake of clarity, we use the example of an application requesting access to a surface, but the same issues arise with respect to other producers or clients of a surface structure. In general a producer is an entity in the system that is writing to a surface, while a client is an entity that is reading from a surface. When we refer to the display device interface in this context, we are referring generally to the display device interface and/or the HAL as shown in FIG. 2.

The method for managing access to a surface can be broken into a variety of different cases depending on the operation being performed and the type of surface structure involved. In the case of flipping, the way in which the interface manages access to surface memory can be classified into two classes: 1) where the flipping structure represents an on screen (visible on monitor) surface, and 2) an off screen surface.

In the first case, the display interface checks whether an application has locked or is biting to the target surface memory before trying to process a new flip request. In addition, the display interface determines whether the display controller has completed a flip already in progress. As explained in further detail below, this basically means that the display controller has finished reading a display address register containing the memory location of the next front buffer. While processing a flip request, the display interface also prevents bits or locks to the target surface memory before another flip request is processed.

In the second case, the flip control also checks whether an application has locked or is biting to the target surface memory before trying to process a new flip request. However, since a hardware page flip is not involved, the flip control does not have to ensure that the display controller has completed a previous page flip request.

In the case of a request for a bit, lock, or some other call to access a surface, the interface determines whether it is safe to access the surface. The interface checks whether a flip is currently in progress for the surface or surfaces of interest, and also checks whether another application has locked or is blting to the surface.

With the above introduction, we now discuss the case of flipping visible surfaces in more detail. Before successfully completing a flip, it is sometimes necessary to check whether the display controller has completed the last flip to avoid generating anomalies (causing tearing) in the display image. For example, this is necessary when an application requests a flip of the front and back buffers in a primary flipping structure to ensure that the application does not begin writing to a buffer that the display device is still reading. It is also necessary when an application attempts to modify surface memory through a bit block transfer or lock request before the display controller completes a flip.

In the case of a primary flipping structure with a front and two or more back buffers, it is usually safe to begin drawing to one of the back buffers because there is at least one extra buffer that the application can modify. For instance if there are two back buffers, the memory region used as the front buffer can be cycled to one back buffer and the application can draw to the other back buffer. A conflict can arise, however, where the application requests two flips in less than the refresh time of the monitor. In these circumstances, it is still necessary to prevent an application from using the surface memory that the display controller is currently reading.

To avoid modifying surface memory that the display controller is reading, the display device interface (or its HAL) checks the state of the display hardware before attempting operations that could cause a conflict such as a flip, a blt, or a request to lock a surface. In the case of a flip operation on a visible flipping structure, it is important to determine whether it is safe to change the address of the surface memory region that is currently serving as the front buffer.

Figure 8:
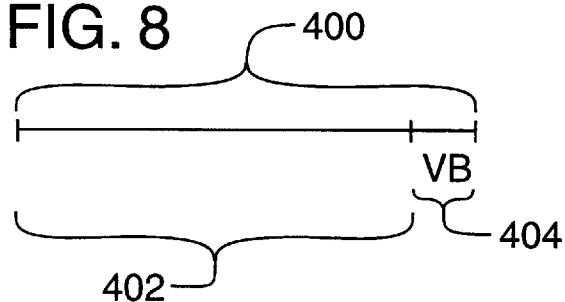
FIG. 8 is a diagram illustrating the refresh period of a display device to help illustrate flipping control.

Before describing how the flip operation in more detail, we begin by illustrating the behavior of typical display controller. FIG. 8 illustrates the refresh period of a typical display controller. The time line represents the entire refresh period 400 of the display. Most display controllers available today have a refresh rate of at least 60 Hz and typically are at or greater than 72 Hz. The first section of the refresh period shown in FIG. 8 represents the scan period 402 when the monitor scans across horizontal scan lines to display the primary surface. The second section represents the vertical blank period (VB or VBL) 404.

In many of the display devices, the display controller reads the address of the next display image during the vertical blank time 404. Once it has read the address, the display hardware can then start to display the next display image. If the hardware supports page or screen flipping, the display device driver (HAL, for example) can change this address, which in effect, instructs the display controller to scan the display image from another region in video memory. Unfortunately, most display hardware does not specify explicitly when it is safe to draw to a back buffer, or in other words, when it has completed a page flip. As such, the display device interface (in conjunction with the HAL or display driver on the host PC) has to determine when it is safe to: 1) modify a back buffer in response to a flip, bit, or lock request; and 2) in the case of flip request, alter the display address.

The display device interface and associated device driver (HAL) control access to surface memory after a flip. For the purposes of this description we refer explicitly to the driver; however, the specific architecture of the interface and driver can vary.

Figure 9:
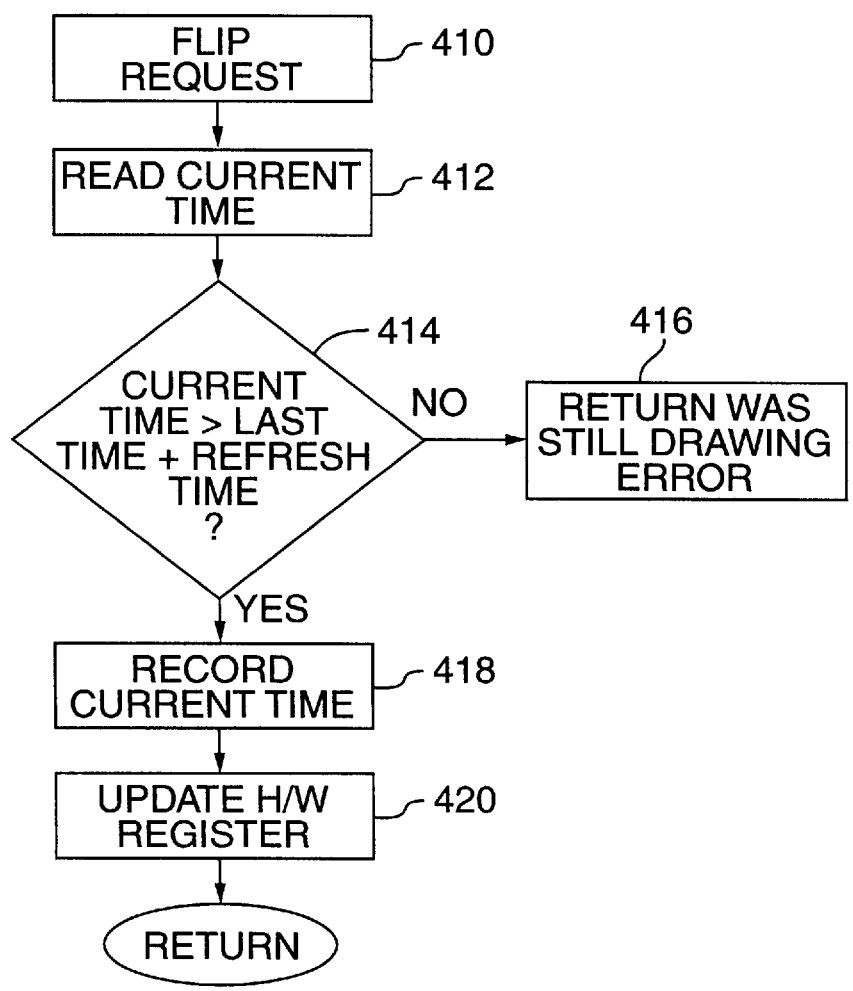
FIG. 9 is a flow diagram illustrating a method for controlling a flip operation.

FIG. 9 is a flow diagram illustrating one possible example of controlling a flip in response to a flip request. The first step 410 represents the flip request of a visible surface (overlay, primary, etc.). In response, the driver reads the current time from a time resource in the computer (412). This time resource can be a hardware or software timer or some other common time keeper found in a computer system.

Next, the driver compares the current time with the sum of the time of the last flip request and the refresh time (414). If an entire refresh period has not elapsed since the last flip request, it is not safe to change the state of the display controller. As such, the driver returns a "WasStillDrawing" error (416).

If a refresh period has elapsed since the last flip request, the driver records the current time of the flip request and proceeds to update the hardware register (418, and 420). Specifically, the driver writes the address of the surface memory of the new front buffer to the display address. At this point, the driver has successfully completed the flip and it returns.

Figure 10:
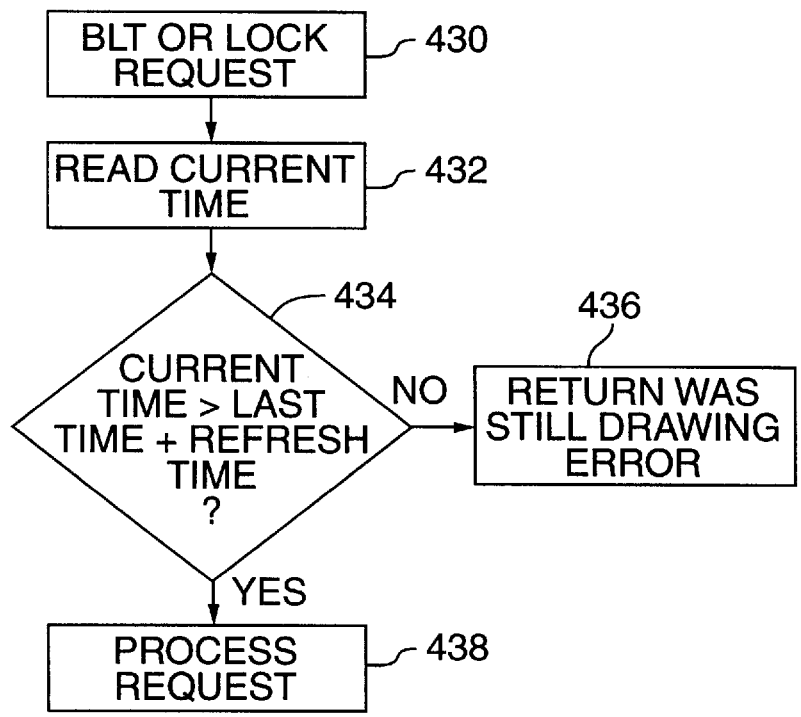
FIG. 10 is a diagram illustrating method for determining whether it is safe to modify a back buffer after a flip request.

A similar method can be used to determine whether to deny a blt or lock request after a flip. FIG. 10 is a flow diagram illustrating a similar method to determine whether the display device interface should return the "WasStillDrawing" error in response to a blt or lock request. Steps 430–436 are the same steps as described above for FIG. 9. Specifically, the driver checks the current time and determines whether a refresh period has elapsed since the last flip. If not, the error is returned. Otherwise, the bit or lock operation proceeds.

In addition, or in the alternative to using the time of the last flip request, the driver can evaluate whether it is safe to complete a flip by determining that the display controller has moved from the VB period since the last flip request. If the display controller is not in the VB period, but was in it the last time, it is safe to change the display address. If the display controller is in the VB period, it is not clear whether it is safe to complete the flip. In this case, another test such as the one illustrated in FIG. 9 can be used to evaluate whether to update the display address.

This particular use of the VBL is just one optimization in the flip operation. It can be exploited if the display controller provides information about whether it is in the VBL period.

Another optimization in the flip control is to read the scan line register, analyze the scan line position relative to the position when the last flip occurred. If the scan line is less than the scan line at the time the last flip occurred, then it is safe to complete the current flip operation.

Figure 11B:
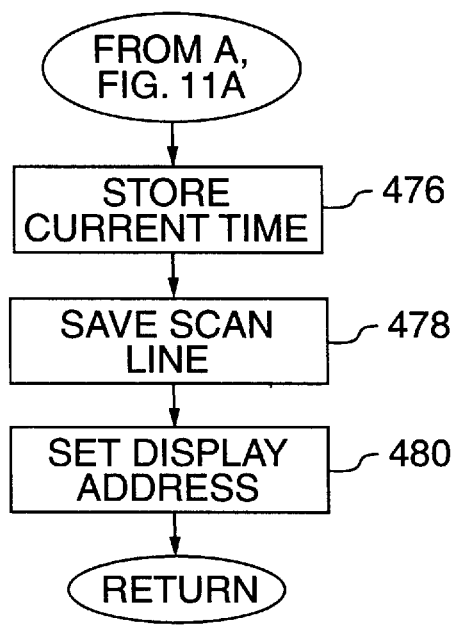
FIGS. 11A and 11B are a flow diagram illustrating another method for controlling a flip operation.

Illustrating these optimizations, FIGS. 12A and 12B are a flow chart of a specific implementation of the flip control. Beginning at the top of FIG. 11A, the method begins with a flip request (450). In response, the flip control proceeds with one or more checks to determine whether it should update the display address. The first check is to determine whether the display address as changed since the last flip request. The flip control reads the display address and determines whether it is the same as it was at the last flip request (452). If the display address has changed since the last flip request, then the display controller has performed a page flip, and it is safe to update the display address for the current flip request. The flip control method then proceeds as shown in FIG. 11B to record current parameters and update the display address.

Figure 11A:
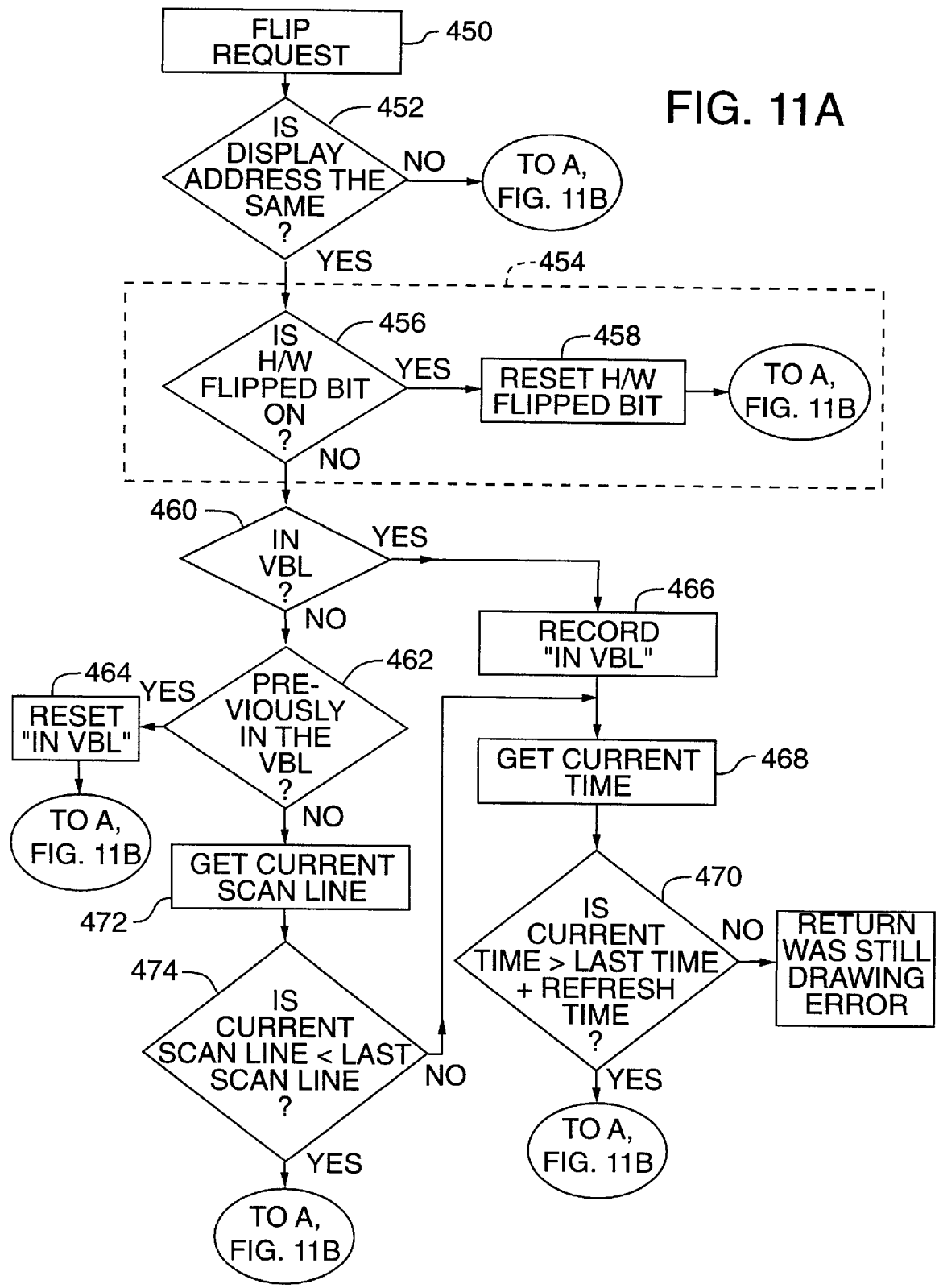

Another check, shown in dashed lines (454) in FIG. 11A, is to check whether the hardware explicitly indicates that it has completed a page flip. This check is shown in dashed lines because it is only available if the display controller provides this information. In most display controllers, this information is not available, so the flip control performs alternative checks using information the display controller does provide, such as whether it is in a vertical blank period and the current position of the scan line. In this particular example, the flip control checks whether a "hardware flipped" bit is on (456). If so, it is safe to update the display address. In these circumstances, the flip control sets the "hardware flipped" bit and proceeds to the steps shown in FIG. 11B.

In the majority of cases where the display controller does not specify that it has completed a page flip explicitly, the flip control has to evaluate the state of the display controller in other ways. As introduced, another approach is to check whether the display controller has moved from the vertical blank period since the last flip request. As shown in step 460, the flip control checks whether the display controller is currently in the vertical blank. If it is not, but was in the VB period on the last flip request (462), then it is safe to update the display address. As such, the flip control resets a bit indicating that the display controller was in the VB period (464) and proceeds to the steps in FIG. 11B.

If the display controller is in the VB period at the current flip request, the flip control has to do more checking. First, it sets the bit indicating that the display controller is in the VB period (466) and then performs a check similar to the one shown in FIG. 9. Specifically, it checks whether a refresh period has elapsed since the last flip request (468, 470). To accomplish this, the flip control gets the current time and compares it with the sum of the last flip request time plus the refresh time. If a refresh time has elapsed, it is safe to update the display address. If not, the flip control returns the "WasStillDrawing" error.

Another way to check whether the display controller has completed a page flip is to evaluate the scan line position at the current time and at the time of the last flip request. This method is illustrated in FIG. 11A beginning at step 472. To summarize, this aspect of the flip control compares the value for the current scan line with the value of the scan line at the last flip request (472, 474). If the current value is less than the previous value, then the display controller has completed a page flip since the last flip request. If the current position of the scan line is below the previous position, then the scan line test is inconclusive, and the flip control proceeds with the time check starting at step 468.

When the flip control determines that it is safe to update the display address, it executes the steps (476–480) shown in FIG. 11B. In this specific implementation, the flip control records the current time (476) and scan line (478), and sets the display address to the address of the surface memory of the front buffer.

As illustrated above, the flip control can perform a variety of checks to determine when to update the display address. In alternative implementations, the type of tests and the specific manner in which they are performed can vary. Though we have explained specific implementations in detail, we do not intend to limit the scope of our invention to these implementations.

For some display controls, additional processing may be required to ensure that the flip control writes the display address without conflicting with the display controller's use of that data. For instance, if the display address is stored in more than one register, it is possible that the flip control could write part of a new address in one register as the display controller reads the display address. In these circumstances, the display controller will look to an incorrect address in video memory to generate the next display image. In effect, the display address that the display controller actually reads is some combination of the previous and current display address, which obviously points to the wrong memory region. To avoid this problem, the flip control can avoid writing the display address during the vertical blank period, the period when the display controller may read the registers holding the display address. As another alternative, the display controller could set a flag when it has read the display register. This latter approach is similar to the approach in dashed lines in FIG. 12B, where the display controller sets a bit indicating that it has completed a page flip.

The approaches described in connection with FIGS. 9–11 generally relate to flip requests for visible surfaces. This includes the primary surface as well as a visible overlay, for example.

Having described and illustrated the principles of our invention with reference to a preferred embodiment and several alternative embodiments, it should be apparent that the invention can be modified in arrangement and detail without departing from its principles. Accordingly, we claim all modifications as may come within the scope and spirit of the following claims.

APPENDIX

Forming a part of the present specification is the following:

Appendix A (Copyright in the appendix is maintained by Microsoft Corporation)

APPENDIX A

*Copyright in the following material is retained by Microsoft Corporation of Redmond, Washington.*

5

The following function descriptions are examples of member functions of a surface object in the DirectDraw display device APIs from Microsoft Corporation of Redmond, WA.

In this implementation, a surface object includes a number of functions
10 to perform a bit block transfer ("blt" or "blit"). A description of the blt functions follows below.

```
HRESULT Blt(
    LPDIRECTDRAWSURFACE lpDDSurface,
15  LPRECT lpDestRect,
    LPDIRECTDRAWSURFACE lpDDSrcSurface,
    LPRECT lpSrcRect,
    DWORD dwFlags,
    LPDDBLTFX lpDDBltFx)
20
```

The blt member function performs a bit block transfer. This member is capable of synchronous or asynchronous blits, either video memory to video memory, video memory to system memory, system memory to video memory, or system memory to system memory. The blits can be performed using Z information, alpha
25 information, source color keys and destination color keys. Arbitrary stretching/shrinking will be performed if the source and destination rectangles are not the same size.

Normally, blt member function will return immediately with an error if the blitter is busy and the blit could not be set up. The DDBLT_WAIT flag can be
30 used to alter this behavior such that blt function will wait until the blit can be set up, or another error occurs, before returning.

The blt member function returns DD_OK if successful, otherwise it returns one of the following error values:

–44–

| DDERR_INVALIDOBJECT | DDERR_INVALIDPARAMS |
| DDERR_GENERIC | DDERR_INVALIDCLIPLIST |
| DDERR_INVALIDRECT | DDERR_NOALPHAHW |
| DDERR_NOBLTHW | DDERR_NOCLIPLIST |
| DDERR_NODDROPSHW | DDERR_SURFACELOST |
| DDERR_UNSUPPORTED | DDERR_NOMIRRORHW |
| DDERR_NORASTEROPHW | DDERR_NOROTATIONHW |
| DDERR_NOSTRETCHHW | DDERR_SURFACEBUSY |
| DDERR_NOZBUFFERHW | | lpDDSurface
    Points to the DirectDrawSurface structure representing the
    DirectDrawSurface. This is the destination of the blit operation.

lpDestRect
    Points to a RECT structure that defines the upper left and lower right points
    of the rectangle on the destination surface to be blitted to.

lpDDSrcSurface
    Points to the DirectDrawSurface structure representing the
    DirectDrawSurface. This is the source for the blit operation.

lpSrcRect
    Points to a RECT structure that defines the upper left and lower right points
    of the rectangle on the source surface to be blitted from.

dwFlags

DDBLT_ALPHADEST
    Use the alpha information in the pixel format or the alpha channel surface
    attached to the destination surface as the alpha channel for this blit.

DDBLT_ALPHADESTCONSTOVERRIDE
    Use the dwConstAlphaDest field in the DDBLTFX structure as the alpha
    channel for the destination surface for this blit.

DDBLT_ALPHADESTNEG
    The NEG suffix indicates that the destination surface becomes more
    transparent as the alpha value increases. (0 is opaque)

DDBLT_ALPHADESTSURFACEOVERRIDE
    Use the lpDDSAlphaDest field in the DDBLTFX structure as the alpha
    channel for the destination for this blit.

DDBLT_ALPHAEDGEBLEND
    Use the dwAlphaEdgeBlend field in the DDBLTFX structure as the alpha
    channel for the edges of the image that border the color key colors.

DDBLT_ALPHASRC
    Use the alpha information in the pixel format or the alpha channel surface
    attached to the source surface as the alpha channel for this blit.

DDBLT_ALPHASRCCONSTOVERRIDE
    Use the dwConstAlphaSrc field in the DDBLTFX structure as the alpha
    channel for the source for this blit.

DDBLT_ALPHASRCNEG
    The NEG suffix indicates that the source surface becomes more transparent
    as the alpha value increases. (0 is opaque)

DDBLT_ALPHASRCSURFACEOVERRIDE
    Use the lpDDSAlphaSrc field in the DDBLTFX structure as the alpha channel
    for the source for this blit.

DDBLT_ASYNC
    Do this blit asynchronously through the FIFO in the order received. If there is
    no room in the hardware FIFO fail the call.

DDBLT_COLORFILL
    Uses the dwFillColor field in the DDBLTFX structure as the RGB color to
    fill the destination rectangle on the destination surface with.

DDBLT_DDFX
    Uses the dwDDFX field in the DDBLTFX structure to specify the effects to
    use for the blit.

DDBLT_DDROPS
    Uses the dwDDROPS field in the DDBLTFX structure to specify the ROPs
    that are not part of the Win32 API.

DDBLT_KEYDEST
    Use the color key associated with the destination surface.

DDBLT_KEYDESTOVERRIDE
    Use the dckDestColorkey field in the DDBLTFX structure as the color key
    for the destination surface.

DDBLT_KEYSRC
    Use the color key associated with the source surface.

DDBLT_KEYSRCOVERRIDE
    Use the dckSrcColorkey field in the DDBLTFX structure as the color key for
    the source surface.

DDBLT_ROP
Use the dwROP field in the DDBLTFX structure for the raster operation for this blit. These ROPs are the same as the ones defined in the Win32 API.

DDBLT_ROTATIONANGLE
Use the dwRotationAngle field in the DDBLTFX structure as the angle (specified in 1/100th of a degree) to rotate the surface.

DDBLT_WAIT
Do not return immediately with the DDERR_WASSTILLDRAWING message if the blitter is busy -- wait until the blit can be set up or another error occurs.

DDBLT_ZBUFFER
Z-buffered blit using the Z buffers attached to the source and destination surfaces and the dwZBufferOpCode field in the DDBLTFX structure as the Z-buffer opcode.

DDBLT_ZBUFFERDESTCONSTOVERRIDE
Z-buffered blit using the dwZDestConst field and the dwZBufferOpCode field in the DDBLTFX structure as the Z buffer and Z-buffer opcode respectively for the destination.

DDBLT_ZBUFFERDESTOVERRIDE
Z-buffered blit using the lpDDSDestZBuffer field and the dwZBufferOpCode field in the DDBLTFX structure as the Z buffer and Z-buffer opcode respectively for the destination.

DDBLT_ZBUFFERSRCCONSTOVERRIDE
Z-buffered blit using the dwConstSrcZ field and the dwZBufferOpCode field in the DDBLTFX structure as the Z buffer and Z-buffer opcode respectively for the source.

DDBLT_ZBUFFERSRCOVERRIDE
Z-buffered blit using the lpDDSSrcZBuffer field and the dwZBufferOpCode field in the DDBLTFX structure as the Z buffer and Z-buffer opcode respectively for the source.

lpDDBltFx

See DDBLTFX structure

DDBLTFX_ALPHA               DDBLTFX_MIRRORLEFTRIGHT
DDBLTFX_MIRRORUPDOWN        DDBLTFX_NOTEARING
DDBLTFX_ROTATE180           DDBLTFX_ROTATE270
DDBLTFX_ROTATE90

- 47 -

```
HRESULT BltBatch(
   LPDIRECTDRAWSURFACE lpDDDestSurface,
   LPDDBLTBATCH lpDDBltBatch,
   DWORD dwCount,
   DWORD dwFlags)
```

The blt batch member function performs a sequence of blt function operations from several sources to a single destination.

This function returns DD_OK if successful, otherwise it returns one of the following error values:

| | |
|---|---|
| DDERR_INVALIDOBJECT | DDERR_INVALIDPARAMS |
| DDERR_GENERIC | DDERR_INVALIDCLIPLIST |
| DDERR_INVALIDRECT | DDERR_NOALPHAHW |
| DDERR_NOBLTHW | DDERR_NOCLIPLIST |
| DDERR_UNSUPPORTED | DDERR_SURFACELOST |
| DDERR_NODDROPSHW | DDERR_NOMIRRORHW |
| DDERR_NORASTEROPHW | DDERR_NOROTATIONHW |
| DDERR_NOSTRETCHHW | DDERR_SURFACEBUSY |
| DDERR_NOZBUFFERHW | | lpDDDestSurface
    Points to the DirectDrawSurface structure representing the DirectDrawSurface. This is the destination of the blit operations.

lpDDBltBatch
    Points to the first DDBLTBATCH structure defining the parameters for the blit operations.

dwCount
    The number of blit operations to be performed.

dwFlags
    Not currently used.

```
HRESULT BltFast(
   LPDIRECTDRAWSURFACE lpDDSurface,
   DWORD dwX,
   DWORD dwY,
   LPDIRECTDRAWSURFACE lpDDSrcSurface,
   LPRECT lpSrcRect,
   DWORD dwTrans)
```

This function performs a source copy blit or transparent blit using a source or destination color key. The bltfast member always attempts to perform an asynchronous blit if the hardware supports this. It only works on video memory surfaces and cannot clip.

Normally, the blt fast member function will return immediately with an error if the blitter is busy and the blit could not be set up. The DDBLTFAST_WAIT flag can be used to alter this behavior such that the blt fast member function will wait until the blit can be set up, or another error occurs, before returning.

This function returns DD_OK if successful, otherwise it returns one of the following error values:

| | |
|---|---|
| DDERR_INVALIDOBJECT | DDERR_INVALIDPARAMS |
| DDERR_GENERIC | DDERR_SURFACELOST |
| DDERR_SURFACEBUSY | DDERR_INVALIDRECT |
| DDERR_EXCEPTION | DDERR_UNSUPPORTED |
| DDERR_NOBLTHW | | lpDDSurface
    Points to the DirectDrawSurface structure representing the DirectDrawSurface. This is the destination of the blit operation.

dwX
    X coordinate on destination surface to blit to.

dwY
    Y coordinate on destination surface to blit to.

lpDDSrcSurface
    Points to the DirectDrawSurface structure representing the DirectDrawSurface. This is the source for the blit operation.

lpSrcRect
    Points to a RECT structure that defines the upper left and lower right points of the rectangle on the source surface to be blitted from.

dwTrans
    Specify the type of transfer.

DDBLTFAST_DESTCOLORKEY
    Transparent blit using the destination's color key.

DDBLTFAST_NOCOLORKEY
    Normal copy blit -- no transparency.

DDBLTFAST_SRCCOLORKEY
: Transparent blit using the source's color key.

DDBLTFAST_WAIT
: Do not return immediately with the DDERR_WASSTILLDRAWING message if the blitter is busy -- wait until the blit can be set up or another error occurs.

We claim:

1. In a display device application programming interface (API) in a computer having a display controller for converting a pixmap into a display image on a display screen, a computer-implemented method for supporting generalized flipping of surface memory, the method comprising:

in response to an API request to create a flippable surface, allocating front and back buffers in video or main memory, creating a flipping structure representing the front and back buffers, storing memory locations of the front and back buffers in the flipping structure, and storing surface type in the flipping structure, wherein the flipping structure represents an offscreen pixmap, a texture map, an overlay, a sprite, an alpha buffer, or a Z buffer;

in response to an API request to lock a region of the front buffer or back buffer, determining whether an application or the display controller is currently accessing the region, and if not, giving a requesting application exclusive access to the region as long as the requesting application holds a lock for the region; and in response to an API request to flip the flippable surface, performing the steps of:
  determining whether any application or the display controller is accessing the front or back buffers, and
  when no application is accessing the front or back buffer and the display controller is not accessing the front or back buffer, flipping the front and back buffers and updating the memory locations of the front and back buffers stored in the flipping structure to reflect new memory locations of the front and back buffers.

2. The method of claim 1 wherein the flippable surface is a texture flipping surface, and further including:

while holding the lock on the back buffer, drawing a first texture map to the back buffer; and while holding the lock on the front buffer, texture mapping a second texture map in the front buffer to a 3D graphical object.

3. The method of claim 2 further including:

repetitively making requests to lock the back buffer, and while holding each lock corresponding to each lock request on the back buffer, drawing a video frame to the back buffer; and repetitively making requests to lock the front buffer, and while holding each lock corresponding to each lock request on the front buffer, texture mapping a video frame currently stored in the front buffer to a 3D graphical object.

4. The method of claim 1 wherein the flippable surface is a texture flipping surface, and further including:

filling the front buffer with a texture image including locking the back buffer, writing the texture image to the back buffer, and unlocking the back buffer, wherein the step of locking comprises granting an application exclusive access to the back buffer;

flipping the front and back buffer including checking whether any application holds a lock on either the front and back buffer, and if not, swapping the front and back buffer so that the texture image resides in the front buffer; and performing a texture mapping operation including locking the back buffer, texture mapping the texture image to a surface of a graphical object, and after the texture mapping step is complete, unlocking the front buffer.

5. The method of claim 1 wherein the flippable surface represents first and second alpha buffers, and the front and back buffers each store an array of alpha data.

6. The method of claim 1 wherein the flippable surface represents first and second z buffers, and the front and back buffers each store an array of depth data.

7. The method of claim 1 further including:

in response to a bit block transfer (blt) API request to copy a block of pixels to a destination in the front or back buffer, checking whether an application currently has a lock or is already performing a bit block transfer to the destination, and if so, denying the request.

8. The method of claim 1 further including:

in response to a bit block transfer API request to copy a block of pixels to a destination region in the front or back buffer, checking whether an application currently has a pending flip request on the destination region or whether another bit block transfer to or from the destination region is in progress, and if so, waiting until the pending flip request is completed for the destination region or the bit block transfer in progress is completed to carry out the bit block transfer API request.

9. The method of claim 1 wherein the step of determining whether an application or the display controller is currently accessing the region includes determining whether any application holds a lock to the region, determining whether a bit block transfer to or from the region is in progress, and determining whether a flip operation is in progress on the front or back buffers.

10. The method of claim 1 wherein a pixmap in the front buffer is converted to a display image and displayed on a display monitor by a display controller and wherein the steps performed in response to the API request to flip the front and back buffers include:

determining whether a previous request to flip the front and back buffers is complete.

11. The method of claim 10 further including:

determining whether a refresh period of the display controller has elapsed since the previous flip request.

12. The method of claim 11 further including:

reading a current position of the scan line and determining whether the current position of the scan line is less than a position of the scan line at the time of the previous flip request.

13. The method of claim 11 further including:

determining whether the display controller has moved from a vertical blank period since the previous flip request.

14. In a computer having a display controller for converting a pixmap into a display image on a display screen, a computer implemented method for controlling flipping comprising:

in response to a request to flip a front buffer and a back buffer, evaluating whether to instruct the display controller to flip the front and back buffer including:
  determining whether a refresh period of the display controller has elapsed since a previous flip request; and
  reading a current position of the scan line and determining whether the current position of the scan line is less than a position of the scan line at the time of the previous flip request;
  if, based on the evaluating step, the display controller has completed a flip since the last flip request, then instructing the display controller to flip the front and back buffer.

15. The method of claim 14 further including:
at successive flip requests, recording whether the display controller is in a vertical blank period; and
evaluating whether to instruct the display controller to flip the front and back buffer by determining whether the display controller has moved from the vertical blank period since the previous flip request.

16. The method of claim 14 wherein the step of instructing the display controller to flip the front and back buffer comprises writing an address of the back buffer into a display register of the display controller such that the back buffer becomes the front buffer in the next refresh period.

17. The method of claim 16 wherein the evaluating step includes reading the display register to determine whether a display address has changed since the previous flip request.

18. A computer readable medium on which is stored an application programming interface (API) for controlling acces to a display controller, said API comprising instructions, which when executed by the computer, perform the steps of:
in response to an API request to create a flippable surface, allocating front and back buffers in video or main memory, creating a flipping structure representing the front and back buffers, storing memory locations of the front and back buffers in the flipping structure, and storing surface type in the flipping structure, wherein the flipping structure represents an offscreen pixmap, a texture map, an overlay, a sprite, an alpha buffer, or a Z buffer;
in response to an API request to lock a region of the front buffer or back buffer, determining whether an application or the display controller is currently accessing the region, and if not, giving a requesting application exclusive access to the region as long as the requesting application holds a lock for the region; and
in response to an API request to flip the flippable surface, performing the steps of:
determining whether any application or the display controller is accessing the front or back buffers, and
when no application is accessing the front or back buffer and the display controller is not accessing the front or back buffer, flipping the front and back buffers and updating the memory locations of the front and back buffers stored in the flipping structure to reflect new memory locations of the front and back buffers.

19. A display device application programming interface implemented in a computer system including a processor, system memory, a display controller, and video memory, the display device API comprising:
an interface function operable to create an instance of a display object in response to a create display object call from an application executing in the computer system,
the display object including a create surface member function operable to create an instance of a flippable surface object representing a flippable surface of a type selected from the group consisting of:
an offscreen pixmap,
a texture map,
an overlay,
an alpha buffer, and
a Z buffer;
wherein each instance of the flippable surface object includes reference pointers to locations in video or system memory where corresponding flippable surfaces are stored, and includes data identifying the type of the flippable surface; and
wherein the surface object includes a flip member function operable to control flipping of each instance of the flippable surface object, and lock and unlock member functions operable to synchronize access of one or more applications to the locations in video or system memory where the corresponding flippable surfaces are stored.

20. In a display device interface for a display controller that converts a primary surface into a display screen on a display monitor, a computer-implemented method for supporting generalized flipping of surface memory, the method comprising:
in response to a request to create a primary flipping surface, creating a primary flipping surface structure;
in the primary surface structure, storing a front buffer reference to a front buffer that holds a pixmap being displayed on the display screen, and storing a back buffer reference to a back buffer that holds pixmap to be displayed on the display screen;
in response to a request to create a second flipping surface, creating a second flipping structure;
in the second flipping surface structure, storing a front buffer reference to a front buffer for storing a first array of pixel data, and storing a back buffer reference to a back buffer for constructing a second array of pixel data, wherein the first and second arrays of pixel data are of a type selected from the group consisting of:
an offscreen pixmap,
a sprite,
a texture map,
an overlay,
an alpha buffer, and
a Z buffer;
in response to a request to flip the primary flipping structure by an application, determining whether another application is currently accessing the front or back buffers corresponding to the primary flipping structure, determining whether the display controller has completed a previous flip request, and if no other application is accessing the front or back buffers and the display controller has completed a previous flip request, then writing an address of the back buffer to the display controller, and updating the front and back buffer references in the primary flipping structure;
in response to a request to flip the second flipping structure from an application, determining whether another application is currently accessing the front or back buffers corresponding to the second flipping structure, and if not, updating the front and back buffer references in the second flipping structure;
in response to requests from applications to access the front or back buffer of the primary flipping structure, synchronizing access to the back buffer of the primary flipping structure; and
in response to requests from applications to access the front or back buffer of the second flipping structure, synchronizing access to the front buffer and back buffer of the second flipping structure.

21. The method of claim 20 wherein the second flipping surface structure is a texture flipping structure, and further including:
in response to a lock request for the back buffer of the texture flipping structure from an application, granting the application exclusive access to the back buffer of the texture flipping structure as long as the application holds a lock on the back buffer;

in response to an unlock request for the back buffer of the texture flipping structure from the application, freeing access to the back buffer of the texture flipping structure;

in response to a lock request for the front buffer of the texture flipping structure from a 3D rendering system, granting the 3D rendering system exclusive access to the front buffer of the texture flipping structure;

in response to an unlock request for the front buffer of the texture flipping structure from the 3D rendering system, freeing access to the front buffer of the texture flipping structure; and in response to a request to flip the front and back buffers in the texture flipping structure, checking whether any client has a lock on either the front or back buffers of the texture flipping structure, and if not, swapping the front and back buffers of the texture flipping structure.

22. In a display device interface for a display device controller that converts a primary surface into a display screen on a display monitor, a computer-implemented method for supporting generalized flipping of surface memory, the method comprising:

receiving a call from an application to create a flipping structure, wherein the application designates any of the types of surfaces selected from the group consisting of:
an offscreen pixmap,
a pixmap that covers less than the entire display screen,
a texture map,
an overlay,
an alpha buffer, and
a Z buffer;
in response to the call to create the flipping structure, creating a flipping structure including a front buffer for storing a first array of pixel data for use by a client other than the display device, and a back buffer for constructing a second array of pixel data;
synchronizing access to the back buffer; and
in response to a request to flip the flipping structure from an application, flipping the front and back buffer.

23. The method of claim 22 wherein the flipping surface structure is a texture flipping structure, and further including:

in response to a lock request for the back buffer of the texture flipping structure from an application, granting the application exclusive access to the back buffer of the texture flipping structure as long as the application holds a lock on the back buffer;

in response to an unlock request for the back buffer of the texture flipping structure from the application, freeing access to the back buffer of the texture flipping structure;

in response to a lock request for the front buffer of the texture flipping structure from a 3D rendering system, granting the 3D rendering system exclusive access to the front buffer of the texture flipping structure;

in response to an unlock request for the front buffer of the texture flipping structure from the 3D rendering system, freeing access to the front buffer of the texture flipping structure; and in response to a request to flip the front and back buffers in the texture flipping structure, checking whether any client has a lock on either the front or back buffers of the texture flipping structure, and if not, swapping the front and back buffers of the texture flipping structure.

* * * * *

UNITED STATES PATENT AND TRADEMARK OFFICE
CERTIFICATE OF CORRECTION

PATENT NO. : 5,844,569

DATED : December 1, 1998

INVENTOR(S) : Eisler et al.

It is certified that error appears in the above-identified patent and that said Letters Patent is hereby corrected as shown below:

Column 1, line 27, "08/641,017;" should read --08/641,016--.

Column 21, line 24, "biter" should read --blter--.

Column 22, line 47, "biting" should read --blting--.

Column 22, line 54, "bits" should read --blts--.

Column 22, line 57, "biting" should read --blting--.

Column 22, line 62, "bit" should read --blt--.

Column 23, line 58, "bit" should read --blt--.

Column 24, line 28, "bit" should read --blt--.

In the Claims:

Column 42, line 40,(claim 12) "claim 11" should read --claim 10--.

Column 42, line 45,(claim 13) "claim 11" should read --claim 10--.

Signed and Sealed this

Eleventh Day of April, 2000

Q. TODD DICKINSON

Attest:

Attesting Officer

Director of Patents and Trademarks